(12) United States Patent
Kumabe et al.

(10) Patent No.: US 8,892,331 B2
(45) Date of Patent: Nov. 18, 2014

(54) DRIVE ASSIST SYSTEM AND WIRELESS COMMUNICATION DEVICE FOR VEHICLE

(75) Inventors: Seigou Kumabe, Okazaki (JP); Takahisa Yamashiro, Chiryu (JP)

(73) Assignee: Denso Corporation, Kariya (JP)

( * ) Notice: Subject to any disclaimer, the term of this patent is extended or adjusted under 35 U.S.C. 154(b) by 102 days.

(21) Appl. No.: 13/527,982

(22) Filed: Jun. 20, 2012

(65) Prior Publication Data

US 2012/0330527 A1 Dec. 27, 2012

(30) Foreign Application Priority Data

Jun. 27, 2011 (JP) ................................. 2011-141929

(51) Int. Cl.
*B60T 7/12* (2006.01)
*G05D 1/00* (2006.01)
*G06F 7/00* (2006.01)
*G06F 17/00* (2006.01)
*B60W 40/04* (2006.01)
*B60W 30/16* (2012.01)

\* cited by examiner

(52) U.S. Cl.
CPC ............... *B60W 40/04* (2013.01); *B60W 30/16* (2013.01); *B60W 2550/308* (2013.01); *B60W 2550/402* (2013.01); *B60W 2550/408* (2013.01)
USPC .................... 701/98; 701/96; 701/97; 701/93; 701/470; 701/428; 701/300; 701/469; 701/50; 701/468; 701/514; 342/357.24; 342/357.3; 342/457; 342/357.55; 342/357.68; 356/152.1; 340/995.18

(58) Field of Classification Search
CPC ..... G06N 3/004; G06N 3/0436; G06N 3/086; G06N 99/005; G05D 1/00; B60T 7/22; F16H 2061/0081; G06Q 30/02; G01S 5/0072; G01S 2205/001; G08G 1/00; B60K 31/0008; B60K 31/047; B60K 31/107; B60K 35/00; B60K 20/00; B60K 20/102; B60K 20/104; B60K 20/106; B60K 20/1062; B60K 20/1082; B60K 20/1084; B60K 20/1086; B60K 20/1088; B60K 30/00; B60K 30/02; B60K 30/025; B60K 30/04; B60K 30/045; B60K 30/06; B60K 30/08; B60K 30/085; B60K 30/09; B60K 30/095; B60K 30/0953; B60K 30/0956; B60K 30/10; B60K 30/12; B60K 30/14; B60K 30/143; B60K 30/146; B60K 30/16; B60K 30/162; B60K 30/165; B60K 30/17; B60K 30/18009; B60K 30/18018; B60K 30/18027; B60K 30/181; B60K 30/18145; B60K 30/18154; B60K 30/18163; B60K 30/18172; B60K 30/18181; B60K 30/1819; B60K 30/182; B60K 40/00; B60K 40/02; B60K 40/04; B60K 40/06; B60K 40/064; B60K 40/068; B60K 40/072; B60K 40/076; B60K 40/08; B60K 40/09; B60K 40/10; B60K 40/1005; B60K 40/101; B60K 40/103; B60K 40/105; B60K 40/107; B60K 40/109; B60K 2050/0057; B60K 2420/00; B60K 2420/40; B60K 2420/403; B60K 2420/406; B60K 2420/52; B60K 2420/62; B60K 2420/90; B60K 2420/905; B60K 2422/00; B60K 2422/95; B60K 2520/00; B60K 2520/06; B60K 2530/00; B60K 2530/14; B60K 2530/145; B60K 2530/16; B60K 2530/18; B60K 2540/00; B60K 2540/04; B60K 2540/10; B60K 2540/103; B60K 2540/106; B60K 2540/16; B60K 2540/165; B60K 2540/18; B60K 2540/20; B60K 2540/30; B60K 2550/10; B60K 2550/12; B60K 2550/14; B60K 2550/141; B60K 2550/142; B60K 2550/143; B60K 2550/145; B60K 2550/146; B60K 2550/147; B60K 2550/148; B60K 2550/20; B60K 2550/22; B60K 2550/30; B60K 2550/302; B60K 2550/304; B60K 2550/306; B60K 2550/308; B60K 2550/40; B60K 2550/402; B60K 2550/404; B60K 2550/406; B60K 2550/408; B60K 2600/00; B60K 2720/106; B60K 2750/00; B60K 2750/30; B60K 2750/302; B60K 2750/304; B60K 2750/306; B60K 2750/308; B60K 2750/40; B60K 2900/00
USPC ........... 701/470, 428, 472, 300, 469, 50, 468, 701/514; 342/357.24, 357.3, 457, 357.55, 342/357.68; 356/152.1; 340/995.18
See application file for complete search history.

(56) References Cited

U.S. PATENT DOCUMENTS

| | | | | |
|---|---|---|---|---|
| 5,375,059 A | * | 12/1994 | Kyrtsos et al. | ................ 701/470 |
| 5,390,125 A | * | 2/1995 | Sennott et al. | ................ 701/472 |
| 5,438,517 A | * | 8/1995 | Sennott et al. | ................ 701/470 |
| 5,477,459 A | * | 12/1995 | Clegg et al. | ................... 701/300 |
| 6,892,134 B2 | * | 5/2005 | Lacey et al. | ................... 701/428 |
| 7,792,860 B2 | * | 9/2010 | Shrivastava et al. | .......... 707/786 |
| 8,311,696 B2 | * | 11/2012 | Reeve | ............................. 701/23 |

| | | | | |
|---|---|---|---|---|
| 8,340,819 B2 * | 12/2012 | Mangaser et al. | | 700/253 |
| 8,384,755 B2 * | 2/2013 | Wang et al. | | 348/14.05 |
| 8,401,275 B2 * | 3/2013 | Wang et al. | | 382/153 |
| 8,437,901 B2 * | 5/2013 | Anderson | | 701/23 |
| 8,463,435 B2 * | 6/2013 | Herzog et al. | | 700/248 |
| 8,483,930 B2 * | 7/2013 | Kawaguchi et al. | | 701/100 |
| 8,515,577 B2 * | 8/2013 | Wang et al. | | 700/247 |
| 2007/0112700 A1 * | 5/2007 | Den Haan et al. | | 706/14 |
| 2010/0220008 A1 * | 9/2010 | Conover et al. | | 342/357.29 |
| 2010/0222076 A1 * | 9/2010 | Poon et al. | | 455/456.1 |
| 2010/0225537 A1 * | 9/2010 | Abraham | | 342/357.49 |
| 2010/0228480 A1 * | 9/2010 | Lithgow et al. | | 701/226 |
| 2010/0231443 A1 * | 9/2010 | Whitehead | | 342/357.23 |
| 2012/0214463 A1 * | 8/2012 | Smith et al. | | 455/418 |

FOREIGN PATENT DOCUMENTS

| | | | |
|---|---|---|---|
| JP | 2005-050187 | | 2/2005 |
| JP | 2007-280060 | | 10/2007 |
| JP | 2008262418 A | * | 10/2008 |
| JP | 2009-211265 | | 9/2009 |

OTHER PUBLICATIONS

Securing position and distance verification in wireless networks; Srdjan Capkun and Jean-Pierre Hubaux, Laboratory for Computer Communications and Applications (LCA), Swiss Federal Institute of Technology Lausanne (EPFL), CH-1015 Lausanne, Switzerland, srdjan.capkun@eofl.ch, jean-pierre.hubaux@epfl.ch.*

* cited by examiner

*Primary Examiner* — John Q Nguyen
*Assistant Examiner* — James E Stroud
(74) *Attorney, Agent, or Firm* — Harness, Dickey & Pierce, PLC

(57) ABSTRACT

A drive assist system includes: wireless communication devices on first and second vehicles. The wireless communication device on the first vehicle includes: a distance calculation device for calculating a satellite positioning distance between the first and second vehicles; and a difference calculation device for calculating a distance difference between the satellite positioning distance and a distance to the second vehicle obtained by a ranging sensor in the first vehicle. The wireless communication device of the second vehicle includes: a distance calculation device for calculating a satellite positioning distance between the second vehicle and a third vehicle; and an inter-vehicle distance determination device for estimating an inter-vehicle distance between the second and third vehicles based on the distance difference and the satellite positioning distance calculated by the distance calculation device of the second vehicle, assuming the inter-vehicle distance is not detected by a ranging sensor in the second vehicle.

18 Claims, 8 Drawing Sheets

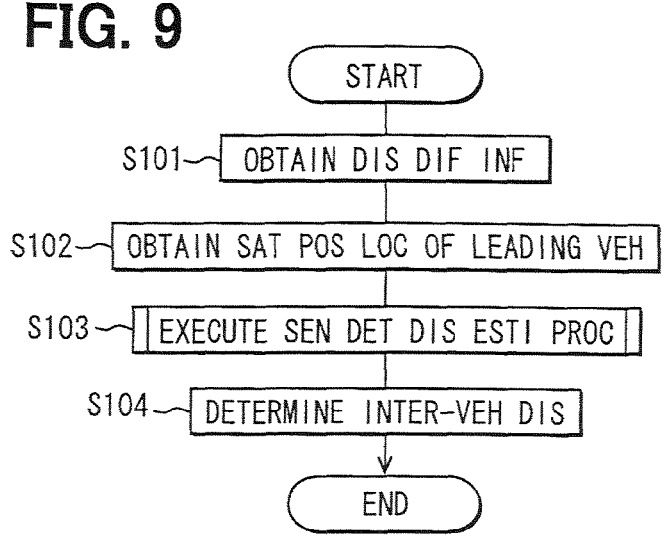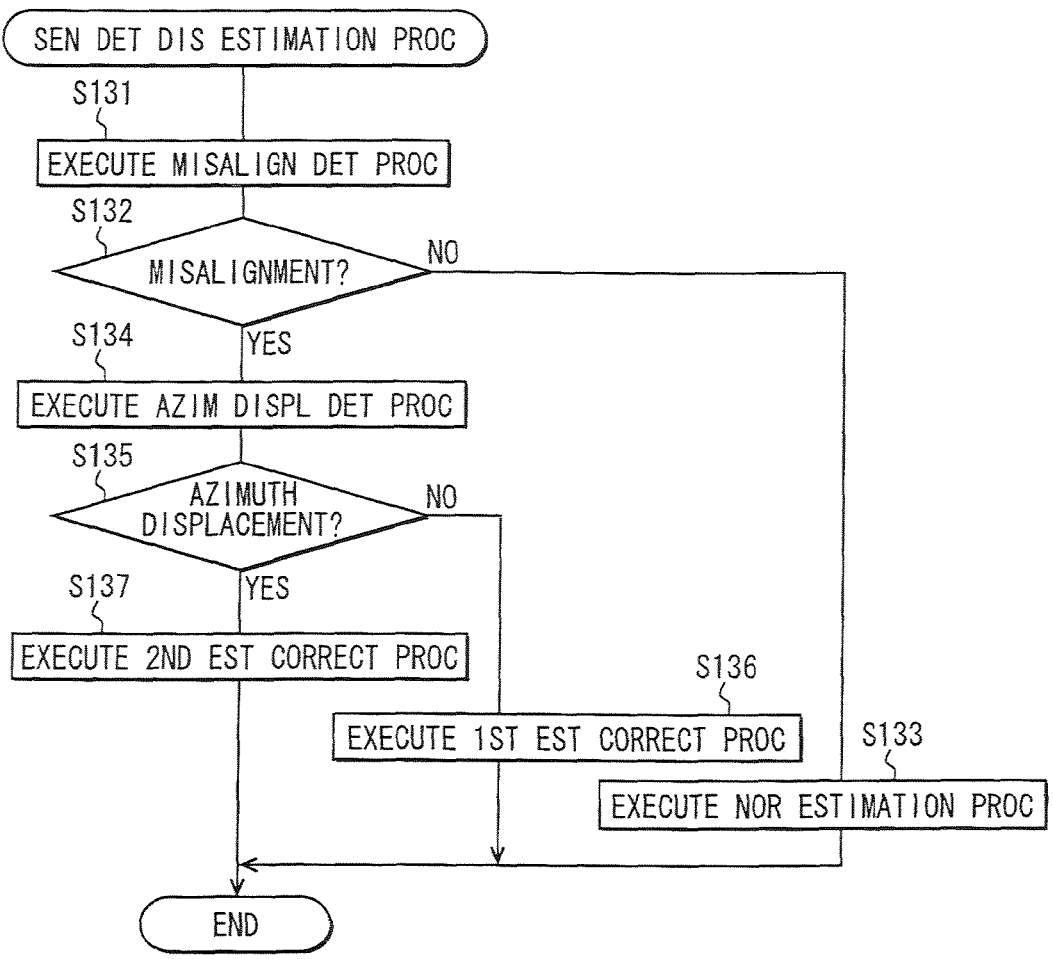

DRIVE ASSIST SYSTEM AND WIRELESS COMMUNICATION DEVICE FOR VEHICLE

CROSS REFERENCE TO RELATED APPLICATION

This application is based on Japanese Patent Application No. 2011-141929 filed on Jun. 27, 2011, the disclosure of which is incorporated herein by reference.

TECHNICAL FIELD

The present disclosure relates to a drive assist system that detects an inter-vehicle distance and relates to a wireless communication device for a vehicle included in the drive assist system.

BACKGROUND

There is an adaptive cruise control (ACC) system that automatically controls an inter-vehicle distance between an own vehicle and a leading vehicle by detecting an inter-vehicle distance between the own vehicle and the leading vehicle using a ranging sensor, such as a laser radar. For example, Patent Document 1 discloses a technique of performing ACC by detecting an inter-vehicle distance between the own vehicle and the leading vehicle using a laser radar or a millimeter-wave radar.

Patent Document 1 also discloses, as a method of detecting an inter-vehicle distance between the own vehicle and one other vehicle, a method of utilizing a satellite positioning system, such as a GPS (Global Positioning System), and vehicle-to-vehicle communications as well as problems of this method. According to this method, a location of the other vehicle positioned by a receiver of the satellite positioning system installed to the other vehicle is obtained by vehicle-to-vehicle communications. Then, an inter-vehicle distance between the own vehicle and the other vehicle is obtained by calculating a distance between a location of the own vehicle positioned by a receiver of the satellite positioning system installed to the own vehicle and the location of the other vehicle obtained by vehicle-to-vehicle communications.

Patent Document 1 discloses that the method of detecting an inter-vehicle distance using the satellite positioning system and vehicle-to-vehicle communications has a problem that an error is significant in comparison with a method using a ranging sensor. The technique disclosed in Patent Document 1 therefore uses a value of an inter-vehicle distance calculated by a ranging sensor, such as a laser radar and a millimeter-wave radar, as a value of an inter-vehicle distance between the own vehicle and the leading vehicle.

Patent Document 1: JP-A-2007-280060

In comparison with the method using a satellite positioning system and vehicle-to-vehicle communications, the method of detecting an inter-vehicle distance between the own vehicle and the leading vehicle using a ranging sensor can detect an inter-vehicle distance between the own vehicle and the leading vehicle precisely. However, not all the vehicles are equipped with a ranging sensor, such as a laser radar, and the technique in the related art therefore has a problem that the technique lacks versatility.

Also, even when a vehicle is equipped with a ranging sensor, the vehicle may fail to detect an inter-vehicle distance between the own vehicle and the leading vehicle using the ranging sensor depending on cruising environments, such as a case where a probing wave from the ranging sensor misses the leading vehicle on a curve or slope. In a case where the vehicle fails to detect an inter-vehicle distance between the own vehicle and the leading vehicle using the ranging sensor, an inter-vehicle distance detected using a satellite positioning system and vehicle-to-vehicle communications may be used instead. However, as has been described above, an error is significant with the method using a satellite positioning system and vehicle-to-vehicle communications in comparison with the method using the ranging sensor. Hence, there arises a problem that detection of an inter-vehicle distance between the own vehicle and the leading vehicle becomes less accurate.

SUMMARY

It is an object of the present disclosure to provide a drive assist system and a wireless communication device for a vehicle. Each of the system and the device makes it possible to detect an in-vehicle distance between an own vehicle and a leading vehicle with accuracy more easily while enhancing versatility.

According to a first aspect of the present disclosure, a drive assist system for vehicles includes: a wireless communication device mounted on a first vehicle equipped with a ranging sensor for detecting a distance to an object around the first vehicle and a receiver of a satellite positioning system for successively positioning a current location of the first vehicle; and a wireless communication device mounted on a second vehicle equipped with a receiver of the satellite positioning system for successively positioning a current location of the second vehicle. The wireless communication device of the first vehicle wirelessly communicates with the wireless communication device of the second vehicle, and the wireless communication device of the second vehicle wirelessly communicates with a wireless communication device mounted on a third vehicle equipped with a receiver of the satellite positioning system. The wireless communication device of the second vehicle successively transmits information about the current location of the second vehicle. The wireless communication device of the first vehicle includes: a distance calculation device for calculating a satellite positioning distance between the first vehicle and the second vehicle based on the current location of the second vehicle and the current location of the first vehicle obtained by the receiver of the first vehicle when the wireless communication device of the first vehicle receives the information about the current location of the second vehicle from the wireless communication device in the second vehicle, which is a leading vehicle or a following vehicle of the first vehicle; and a difference calculation device for calculating a distance difference between the satellite positioning distance calculated by the distance calculation device of the first vehicle and the distance to the second vehicle obtained by the ranging sensor. The wireless communication device of the first vehicle transmits information about the distance difference, calculated by the difference calculation device, to the wireless communication device of the second vehicle. The wireless communication device of the second vehicle includes: a distance calculation device for calculating a satellite positioning distance between the second vehicle and the third vehicle based on the current location of the third vehicle and the current location of the second vehicle obtained by the receiver of the second vehicle when the wireless communication device of the second vehicle receives information about the current location of the third vehicle from the wireless communication device in the third vehicle, which is a leading vehicle of the second vehicle; and an inter-vehicle distance determination device for estimating an inter-vehicle distance between the second vehicle and the third vehicle based on the distance difference and the satellite positioning distance calculated by the distance calculation device of the second vehicle when the wireless communication device of the second vehicle receives the information about the distance difference from the wireless communication device of the first vehicle, assuming that the inter-vehicle distance is not detected by a ranging sensor in the second vehicle.

In the above system, even for a vehicle not equipped with the ranging sensor, it becomes possible to detect an inter-vehicle distance between the own vehicle and the leading vehicle with accuracy more easily on the basis of the satellite positioning location-to-location distance. Besides the case as above, even in a case where a vehicle equipped with the ranging sensor is in cruising environments in which the vehicle fails to detect an inter-vehicle distance between the own vehicle and the preceding or succeeding vehicle with the ranging sensor, it becomes possible to detect the inter-vehicle distance between the own vehicle and the leading vehicle with accuracy more easily on the basis of the satellite positioning location-to-location distance. Hence, according to the configuration above, the inter-vehicle distance between the own vehicle and the leading vehicle can be determined with accuracy more easily. It thus becomes possible to detect the inter-vehicle distance between the own vehicle and the leading vehicle with accuracy more easily while enhancing versatility.

According to a second aspect of the present disclosure, a wireless communication device installed to a first vehicle equipped with a ranging sensor for detecting a distance to an object around the first vehicle and a receiver of a satellite positioning system for positioning a current location of the first vehicle, the wireless communication device wirelessly communicating with a wireless communication device installed to a second vehicle equipped with a receiver of the satellite positioning system for positioning a current location of the second vehicle, and receiving information about the current location of the second vehicle from the wireless communication device of the second vehicle, the wireless communication device includes: a distance calculation device for calculating a satellite positioning distance between the first vehicle and the second vehicle based on the current location of the second vehicle and the current location of the first vehicle obtained by the receiver of the first vehicle, when the wireless communication device of the first vehicle receives the information about the current location of the second vehicle from the wireless communication device in the second vehicle, which is a leading vehicle or a following vehicle of the first vehicle; and a difference calculation device for calculating a distance difference between the satellite positioning distance calculated by the distance calculation device of the first vehicle and the distance to the second vehicle obtained by the ranging sensor. The wireless communication device of the first vehicle transmits information about the distance difference, calculated by the difference calculation device.

In the above device, even when a vehicle is not equipped with the ranging sensor, by receiving the transmitted distance difference, it becomes possible to detect an inter-vehicle distance between the own vehicle and the leading vehicle with accuracy more easily on the basis of the received distance difference and the satellite positioning location-to-location distance. Besides the case as above, even in a case where a vehicle equipped with the ranging sensor is in cruising environments in which the vehicle fails to detect an inter-vehicle distance between the own vehicle and the leading vehicle with the ranging sensor, by receiving the transmitted distance difference, it becomes possible to detect the inter-vehicle distance between the own vehicle and the leading vehicle with accuracy more easily on the basis of the received distance difference and the satellite positioning location-to-location distance. Hence, according to the configuration above, it becomes possible to detect the inter-vehicle distance between the own vehicle and the leading vehicle with accuracy more easily while enhancing versatility.

According to a third aspect of the present disclosure, a wireless communication device installed to a second vehicle equipped with a receiver of a satellite positioning system for positioning a current location of the second vehicle, the wireless communication device wirelessly communicating with a wireless communication device installed to a first vehicle equipped with a ranging sensor for detecting a distance to an object around the first vehicle and a receiver of the satellite positioning system for positioning a current location of the first vehicle, communicating with a wireless communication device installed to a third vehicle equipped with a receiver of the satellite positioning system for positioning a current location of the third vehicle, and receiving information about a distance difference, transmitted from and calculated by the wireless communication device of the first vehicle, between a satellite positioning distance from the first vehicle to the second vehicle and a distance from the first vehicle to the second vehicle obtained by the ranging sensor, wherein the satellite positioning distance is calculated by the wireless communication device of the first vehicle based on the current location of the first vehicle calculated by the receiver of the first vehicle and the current location of the second vehicle calculated by the receiver of the second vehicle, the wireless communication device of the second vehicle includes: a distance calculation device for calculating a satellite positioning distance between the second vehicle and the third vehicle based on the current location of the third vehicle and the current location of the second vehicle obtained by the receiver of the second vehicle when the wireless communication device of the second vehicle receives information about the current location of the third vehicle from the wireless communication device in the third vehicle, which is a leading vehicle of the second vehicle; and an inter-vehicle distance determination device for estimating an inter-vehicle distance between the second vehicle and the third vehicle based on the distance difference and the satellite positioning distance calculated by the distance calculation device of the second vehicle when the wireless communication device of the second vehicle receives the information about the distance difference from the wireless communication device of the first vehicle, assuming that the inter-vehicle distance is not detected by a ranging sensor in the second vehicle.

In the above device, even when a vehicle is not equipped with the ranging senor, the inter-vehicle distance between the own vehicle and the leading vehicle can be detected with accuracy more easily on the basis of the distance difference and the satellite positioning location-to-location distance. Besides the case as above, even in a case where a vehicle equipped with the ranging sensor is in cruising environments in which the vehicle fails to detect an inter-vehicle distance between the own vehicle and the preceding or succeeding vehicle with the ranging sensor, the inter-vehicle distance between the own vehicle and the leading vehicle can be detected with accuracy more easily on the basis of the distance difference and the satellite positioning location-to-location distance. Hence, according to the configuration above, it becomes possible to detect the inter-vehicle distance between the own vehicle and the leading vehicle with accuracy more easily while enhancing versatility.

According to a fourth aspect of the present disclosure, a drive assist system for vehicles includes: a wireless communication device mounted on a first vehicle equipped with a ranging sensor for detecting a distance to an object around the first vehicle and a receiver of a satellite positioning system for successively positioning a current location of the first vehicle; a wireless communication device mounted on a second vehicle equipped with a receiver of the satellite positioning system for successively positioning a current location of the second vehicle; a wireless communication device mounted on a third vehicle equipped with a receiver of the satellite positioning system for successively positioning a current location of the third vehicle, which is a leading vehicle or a following vehicle of the first vehicle. The wireless communication device of the first vehicle wirelessly communicates with the wireless communication device of the second vehicle and the wireless communication device of the third vehicle. The wireless communication device of the second vehicle successively transmits information about the current location of the second vehicle. The wireless communication device of the first vehicle includes: a distance calculation device for calculating a satellite positioning distance between the first vehicle and the second vehicle based on the current location of the second vehicle and the current location of the first vehicle obtained by the receiver of the first vehicle when the wireless communication device of the first vehicle receives the information about the current location of the second vehicle from the wireless communication device in the second vehicle, which is a leading vehicle or a following vehicle of the first vehicle; and a difference calculation device for calculating a distance difference between the satellite positioning distance calculated by the distance calculation device of the first vehicle and the distance to the second vehicle obtained by the ranging sensor. The wireless communication device of the first vehicle transmits information about the distance difference, calculated by the difference calculation device, to a wireless communication device in a third vehicle. The wireless communication device in the third vehicle includes: a distance calculation device for calculating a satellite positioning distance between the first vehicle and the third vehicle based on the current location of the third vehicle and the current location of the first vehicle obtained by the receiver of the first vehicle when the wireless communication device in the third vehicle receives information about the current location of the first vehicle from the wireless communication device in the first vehicle; and an inter-vehicle distance determination device for estimating an inter-vehicle distance between the first vehicle and the third vehicle based on the distance difference and the satellite positioning distance calculated by the calculation device of the third vehicle when the wireless communication device of the third vehicle receives the information about the distance difference from the wireless communication device of the first vehicle, assuming that the inter-vehicle distance is not detected by a ranging sensor in the third vehicle.

In the above device, even for a vehicle not equipped with the ranging sensor, it becomes possible to detect an inter-vehicle distance between the own vehicle and the leading vehicle with accuracy more easily on the basis of the satellite positioning location-to-location distance. Besides the case as above, even in a case where a vehicle equipped with the ranging sensor is in cruising environments in which the vehicle fails to detect an inter-vehicle distance between the own vehicle and the preceding or succeeding vehicle with the ranging sensor, it becomes possible to detect the inter-vehicle distance between the own vehicle and the leading vehicle with accuracy more easily on the basis of the satellite positioning location-to-location distance. Hence, according to the configuration above, the inter-vehicle distance between the own vehicle and the leading vehicle can be determined with accuracy more easily. It thus becomes possible to detect the inter-vehicle distance between the own vehicle and the leading vehicle with accuracy more easily while enhancing versatility.

BRIEF DESCRIPTION OF THE DRAWINGS

The above and other objects, features and advantages of the present disclosure will become more apparent from the following detailed description made with reference to the accompanying drawings. In the drawings:

FIG. 9 is a flowchart depicting a flow of processing involved in inter-vehicle distance determination processing by a control portion of the wireless communication device for a second vehicle; and FIG. 10 is a flowchart depicting a flow of sensor detection distance estimation processing.

DETAILED DESCRIPTION

Figure 1:
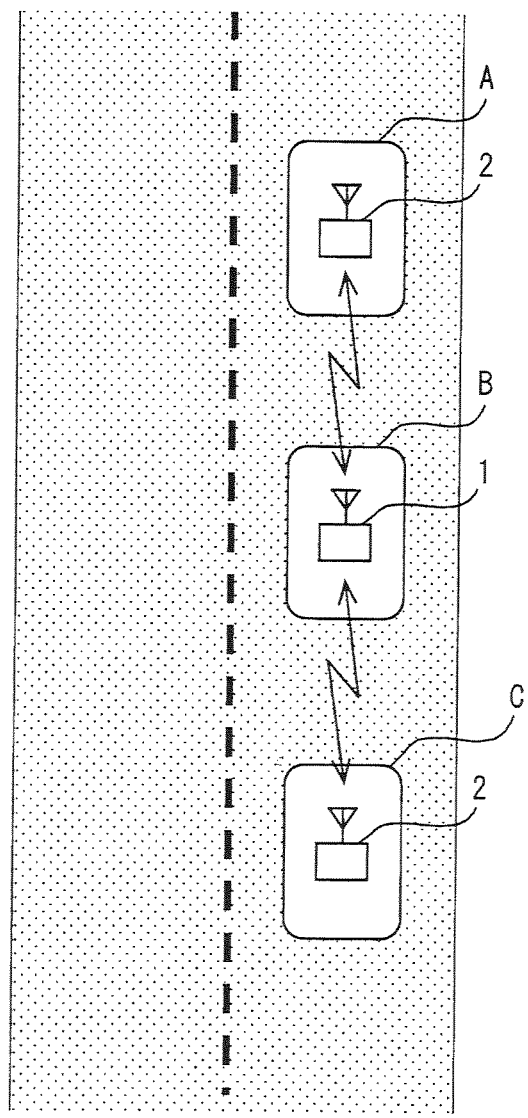
FIG. 1 is a block diagram showing a schematic configuration of a cruise-assist system.

Hereinafter, embodiments of the disclosure will be described using the drawings. FIG. 1 is a block diagram showing a schematic configuration of a cruise-assist system 100 as a drive assist system to which the disclosure is applied. The cruise-assist system 100 shown in FIG. 1 includes a wireless communication device 1 installed to a first vehicle (vehicle B) equipped with a ranging sensor and a receiver of a satellite positioning system and wireless communication devices 2 installed to vehicles (vehicle A and vehicle C) not equipped with a ranging sensor but equipped with a receiver of the satellite positioning system.

The wireless communication device 1 and the wireless communication devices 2 are installed to vehicles, such as automobiles. In this embodiment, assume that these devices are installed to the vehicles A through C as automobiles. Also, assume that wireless communications (that is, vehicle-to-vehicle communications) are enabled between the wireless communication devices 1, between each of the wireless communication devices 2, and between the wireless communication device 1 and the wireless communication device 2.

Figure 2:
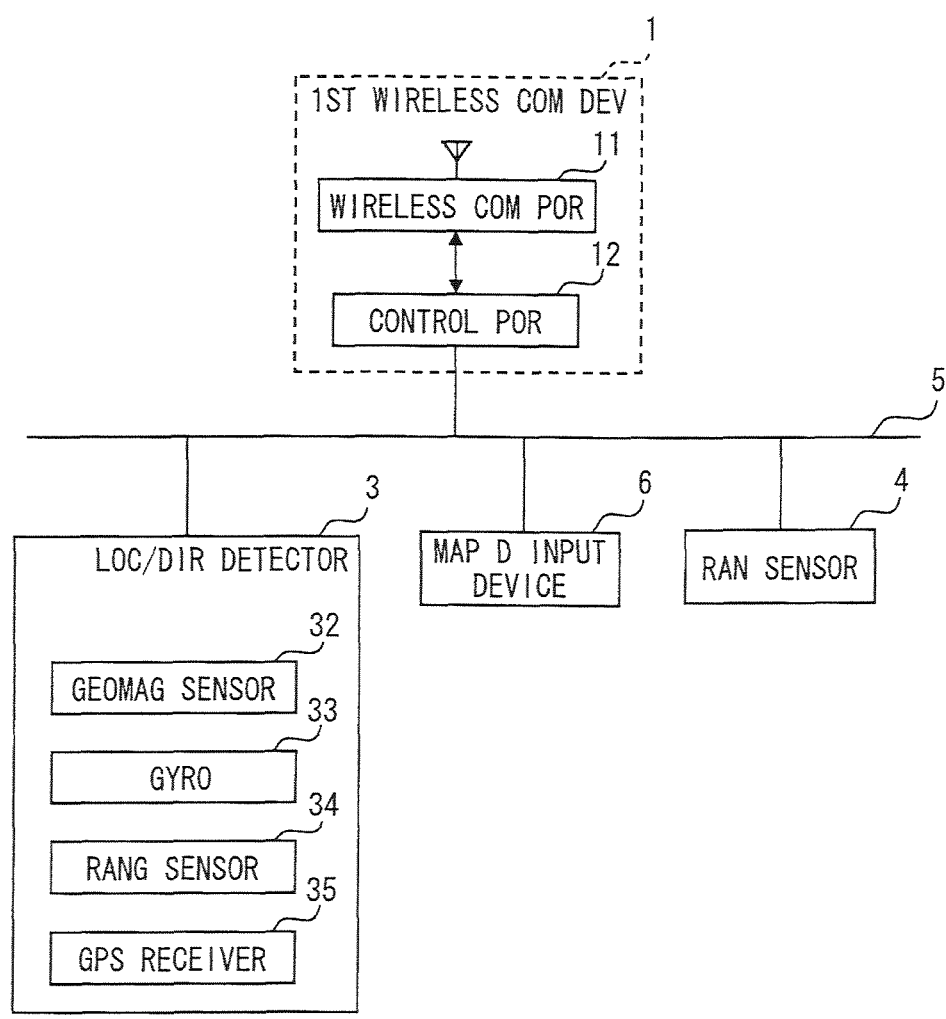
FIG. 2 is a block diagram showing a schematic configuration of a wireless communication device for a first vehicle.

A description will now be given to a schematic configuration of the wireless communication device 1 using FIG. 2. FIG. 2 is a block diagram showing a schematic configuration of the wireless communication device 1. As is shown in FIG. 2, the wireless communication device 1 is provided with a wireless communication portion 11 and a control portion 12. Also, the wireless communication device 1 is connected to a location and direction detector 3, a ranging sensor 4, and a map data input device 6 so that electronic information can be exchanged from one to another. For example, in this embodiment, the wireless communication device 1, the location and direction detector 3, the ranging sensor 4, and the map data input device 6 are interconnected via an in-vehicle LAN 5 in conformity with communication protocols, such as CAN (Controller Area Network). The wireless communication device 1 is equivalent to a wireless communication device for a first vehicle.

The location and direction detector 3 successively detects a current location and a moving direction of an own vehicle on the basis of information obtained from respective sensors including a geomagnetic sensor 32 that detects the magnetism of the earth, a gyroscope 33 that detects an angular speed of an own vehicle about a vertical direction, a distance sensor 34 that detects a distance traveled by the own vehicle, and a GPS (Global Positioning System) receiver 35 for a GPS that detects a current location of the own vehicle according to a radio wave from a satellite. Because each of these sensors has an error of different nature, it is configured in such a manner that two or more sensors are used to make a complement to each other.

Herein, the GPS receiver 35 includes a GPS antenna that receives a radio wave. The GPS antenna may be provided integrally with a receiver main body or separately. In this embodiment, a description will be given on the assumption that the GPS antenna is provided integrally with the receiver main body.

Regarding the respective sensors other than the GPS receiver 35, only a part of those specified above may be used or sensors other than those specified above may be used depending on the accuracy of each sensor. Also, a current location is represented, for example, by longitude and latitude, and a moving direction is represented, for example, by an azimuth angle in reference to the north. The azimuth angle may be detected by the geomagnetic sensor 32, detected by the gyroscope 33, or detected by using the both. Hereinafter, a current location detected using the GPS receiver 35 is referred to as the satellite positioning location.

This embodiment has described a configuration that uses the GPS receiver 35 for the GPS as a receiver of the satellite positioning system. It should be appreciated, however, that the disclosure is not necessarily limited to this configuration. For example, it may be configured in such a manner that a receiver of the satellite positioning system other than the GPS is used instead.

A storage medium (not shown) is loaded in the map data input device 6 and the map data input device 6 is a device used to input map data stored in this storage medium. The map data includes link data specifying roads and node data. The link data is made up of data of a unique number (link ID) identifying a link, a link length specifying a length of the link, a link direction, a link orientation, coordinates (longitude and latitude) of start and end nodes of the link, a name of road, a type of road, a one-way attribution, a width of road, the number of lanes, the presence or absence of a right-turn-only or left-turn-only lane and the number of such lanes, and a speed limit value. On the other hand, the node data is made up of data of a node ID assigned with a unique number for each node at which respective roads on the map intersect, merge, or branch, a node coordinate, a name of node, a connected-link ID written with a link ID of a link connected to the node, and types of intersection.

It should be appreciated that the disclosure is not necessarily limited to a configuration in which data stored in the storage medium loaded in the map data input device 6 is used as the map data. It may be configured in such a manner that data stored in a server device is used via an unillustrated server communication portion.

The ranging sensor 4 is a sensor that detects a distance to a nearby object by sending out a probing wave and receiving a reflected wave of the probing wave reflected on the object. The ranging sensor 4 can be any sensor that sends out a probing wave and receives a reflected wave of the probing wave and can be a sensor using a sound wave, a light wave, or a radio wave. For example, sensors, such as a laser radar and a millimeter-wave radar, can be used as the ranging sensor 4. In this embodiment, the ranging sensor 4 is provided to each of a front section and a rear section of a vehicle so that distances from the vehicle equipped with the wireless communication device 1 to a leading vehicle and to a following vehicle can be detected.

The wireless communication portion 11 of the first wireless communication device 1 for vehicle is provided with a transceiver antenna and distributes information of the own vehicle and receives information of a vehicle at the other end (that is, makes vehicle-to-vehicle communications) with the other vehicle(s) present, for example, within a range of several hundred meters around the location of the own vehicle by wireless communication without using a telephone network. For example, the wireless communication portion 11 makes vehicle-to-vehicle communications by wireless communication using a 700 MHz radio wave. This embodiment has described a configuration in which the wireless communication portion 11 makes vehicle-to-vehicle communications by wireless communication using a 700 MHz radio wave. It should be appreciated, however, that the disclosure is not necessarily limited to this configuration. For example, it may be configured in such a manner that the wireless communication portion 11 makes vehicle-to-vehicle communications by wireless communication using a 5.9 GHz radio wave. In addition, the wireless communication portion 11 transmits data in a regular transmission cycle according to a command from the control portion 12. The transmission cycle may be set, for example, to 100 msec.

The control portion 12 of the wireless communication device 1 is formed as a normal computer and includes therein known components, such as a CPU, a memory including a ROM, a RAM, and an EEPROM, an input and output interface, and a bus line interconnecting these components (none of which is shown). The control portion 12 performs various types of processing on the basis of various types of information inputted therein from the wireless communication portion 11, the location and direction detector 3, the ranging sensor 4, and the map data input device 6.

For example, the control portion 12 controls the wireless communication portion 11 to transmit data in a regular transmission cycle as described above. Herein, data transmitted from the wireless communication portion 11 includes, for example, information on the satellite positioning location and a moving direction of the own vehicle, information on a variance of behaviors of the vehicle, such as braking, an attachment position of the GPS receiver 35 in the own vehicle, and a distance difference described below. Also, in a case where the satellite positioning location and the moving direction of the own vehicle are transmitted, a GPS time at which these satellite positioning location and moving direction were detected may be appended to the data. In this embodiment, a description will be given on the assumption that a GPS time at which the satellite positioning location and the moving direction of the own vehicle were detected is appended to the data when these satellite positioning location and moving direction of the own vehicle are transmitted.

Herein, the control portion 12 obtains the satellite positioning location and the moving direction of the own vehicle from the location and direction detector 3. Also, regarding the information on a variance of behaviors of the vehicle, such as braking (hereinafter, referred to as vehicle condition information), the control portion 12 obtains, for example, speed accelerations before and after the variance and an ON-state signal of a brake switch from a brake ECU into which signals from an acceleration sensor and the brake switch are inputted (none of these components is shown).

Further, regarding the attachment position of the GPS receiver 35 (hereinafter, referred to as the GPS installment position) in the own vehicle, data pre-stored in the memory, such as an EEPROM, of the control portion 12 is used. Herein, at least a distance from a vehicle reference position to the attachment position of the GPS receiver 35 in a horizontal direction (vehicle width direction) is pre-stored as the GPS attachment position. Also, the vehicle reference position is, for example, the center of the vehicle. In a case where the GPS receiver 35 is provided with a separable GPS antenna, the attachment position of the GPS receiver 35 is an attachment position of the GPS antenna. The attachment position of the GPS receiver 35 is equivalent to an installment position of a receiver of a satellite positioning system.

Of these various types of information, the control portion 12 transmits, for example, information on the satellite positioning location of the vehicle, the moving direction of the vehicle, and the GPS attachment position by always including these types of information in the data transmitted in a regular transmission cycle. Meanwhile, the control portion 12 transmits information on the vehicle condition and a distance difference by including these types of information in the data to be transmitted after these types of information are obtained or calculated in the control portion 12.

Besides the foregoing operations, the control portion 12 receives a satellite positioning location and a moving direction successively transmitted from the wireless communication device 1 or the second wireless communication device 2 installed to the other vehicle(s). The control portion 12 finds running paths of the own vehicle and the other vehicle(s) on the basis of the received satellite positioning location and moving direction and the satellite positioning location and the moving direction of the own vehicle. This enables the control portion 12 not only to identify the other vehicles individually, but also to find relative locations of the other individual vehicles with respect to the own vehicle. For example, on the basis of the relative locations and the map data, the control portion1 12 further specifies a leading vehicle of the own vehicle (that is, another vehicle running in front of the own vehicle on the same lane) or a following vehicle of the own vehicle (that is, another vehicle running behind the own vehicle on the same lane). In an example of this embodiment, the control portion 12 specifies the vehicle A as the leading vehicle and the vehicle C as the following vehicle.

Herein, the satellite positioning location and the moving direction of the own vehicle and those of the other vehicle(s) at a same time point are correlated with each other using a GPS time at which these satellite positioning locations and moving directions were detected. Although it will be described below, the GPS time when the satellite positioning location and the moving direction were detected is appended to the satellite positioning location and the moving direction transmitted from the second wireless communication device 2 for vehicle. Also, the satellite positioning location and the moving direction detected in the own vehicle are stored successively into a memory, such as a RAM, of the control portion 12 in correlation with the GPS time at a time point of detection.

Besides the foregoing operations, the control portion 12 performs processing (distance difference calculation processing) to calculate a difference between the distance to the leading vehicle detected by the ranging sensor 4 and a satellite positioning location-to-location distance of the own vehicle and the other vehicle(s). Processing involved in the distance difference calculation processing will be described in detail below.

Figure 3:
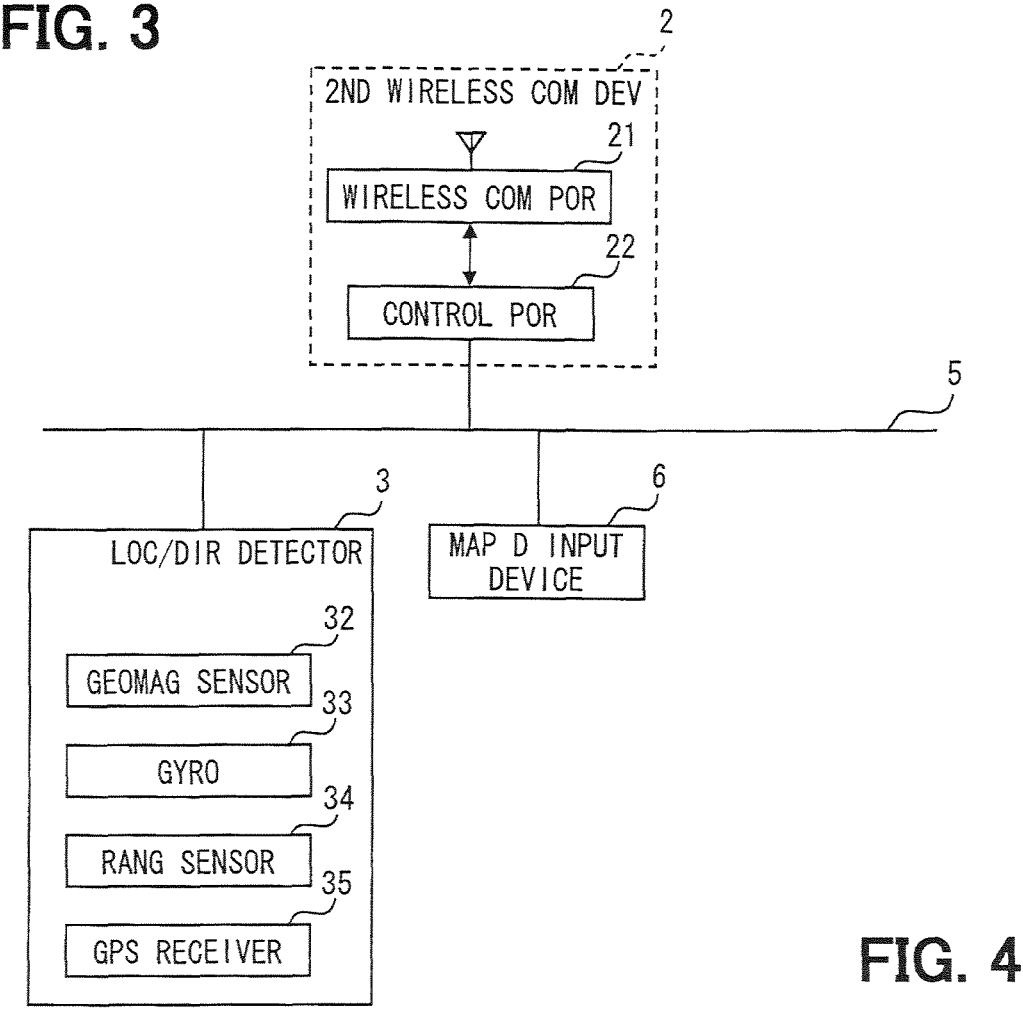
FIG. 3 is a block diagram showing a schematic configuration of a wireless communication device for a second vehicle.

A description will now be given to a schematic configuration of the wireless communication device 2 using FIG. 3. FIG. 3 is a block diagram showing a schematic configuration of the wireless communication device 2. As is shown in FIG. 3, the wireless communication device 2 includes a wireless communication portion 21 and a control portion 22. Also, the wireless communication device 2 is connected to a location and direction detector 3 and a map data input device 6 so that electronic information can be exchanged from one to another. In this embodiment, for example, the wireless communication device 2, the location and direction detector 3, and the map data input device 6 are interconnected via an in-vehicle LAN 5 in conformity with communication protocols, such as CAN (Controller Area Network).

The wireless communication device 2 is configured in the same manner as the wireless communication device 1 except that electronic information is not exchanged with the ranging sensor 4. Hence, for ease of description, members furnished with functions same as those furnished with the members shown in the drawings used to describe the wireless communication device 1 are labeled with the same reference numerals and a description is not repeated. The wireless communication device 2 is equivalent to a wireless communication device for a second vehicle.

The wireless communication portion 21 of the wireless communication device 2 is provided with a transceiver antenna and distributes information of the own vehicle and receives information of a vehicle at the other end (that is, makes vehicle-to-vehicle communications) with the other vehicle(s) present, for example, within a range of several hundred meters around the own vehicle by wireless communication without using a telephone network. For example, the wireless communication portion 21 makes vehicle-to-vehicle communications by wireless communication using a 700 MHz radio wave. This embodiment has described a configuration in which the wireless communication portion 21 makes vehicle-to-vehicle communications by wireless communication using a 700 MHz radio wave. It should be appreciated, however, that the disclosure is not necessarily limited to this configuration. For example, it may be configured in such a manner that the wireless communication portion 21 makes vehicle-to-vehicle communications by wireless communication using a 5.9 GHz radio wave. In addition, the wireless communication portion 21 transmits data in a regular transmission cycle according to a command from the control portion 22. The transmission cycle may be set, for example, to 100 msec.

The control portion 22 of the wireless communication device 2 for vehicle is formed as a normal computer and includes therein known components, such as a CPU, a memory including a ROM, a RAM, and an EEPROM, an input and output interface, and a bus line interconnecting these components (none of which is shown). The control portion 22 performs various types of processing on the basis of various types of information inputted therein from the wireless communication portion 21, the location and direction detector 3, and the map data input device 6.

For example, the control portion 22 controls the wireless communication portion 21 to transmit data in a regular transmission cycle as described above. Herein, data transmitted from the wireless communication portion 21 includes, for example, information on the satellite positioning location and a moving direction of the own vehicle, information on a variance of behaviors of the vehicle, such as braking, and an attachment position of the GPS receiver 35 in the own vehicle. Also, in a case where the satellite positioning location and the moving direction of the own vehicle are transmitted, a GPS time at which these satellite positioning location and moving direction were detected may be appended to the data. In this embodiment, a description will be given on the assumption that a GPS time at which the satellite positioning location and the moving direction of the own vehicle were detected is appended to the data when these satellite positioning location and moving direction of the own vehicle are transmitted.

Herein, the control portion 22 obtains the satellite positioning location and the moving direction of the own vehicle from the location and direction detector 3. Also, regarding the information on a variance of behaviors of the vehicle, such as braking (hereinafter, referred to as vehicle condition information), the control portion 22 obtains, for example, speed accelerations before and after the variance and an ON-state signal of a brake switch from a brake ECU into which signals from an acceleration sensor and the brake switch are inputted (none of these components is shown).

Further, regarding the attachment position of the GPS receiver 35 (hereinafter, referred to as the GPS attachment position) in the own vehicle, data pre-stored in the memory, such as an EEPROM, of the control portion 22 is used. Herein, at least a distance from a vehicle reference position (for example, a center of the vehicle) to the attachment position of the GPS receiver 35 in a horizontal direction (vehicle width direction) is pre-stored as the GPS attachment position.

Of these various types of information, the control portion 22 transmits, for example, information on the satellite positioning location of the vehicle, the moving direction of the vehicle, and the GPS attachment position by always including these types of information in the data transmitted in a regular transmission cycle. Meanwhile, the control portion 22 transmits information on the vehicle condition by including this information in the data to be transmitted after this information is obtained by the control portion 22.

Also, the control portion 22 receives the satellite positioning location and the moving direction successively transmitted from the wireless communication device 1 or the wireless communication device 2 installed to the other vehicle(s). The control portion 22 finds running paths of the other vehicle(s) on the basis of the received satellite positioning location and moving direction. This enables the control portion 22 not only to identify the other vehicles individually, but also to find relative locations of the other individual vehicles with respect to the own vehicle. For example, on the basis of the relative locations and the map data, the control portion 22 further specifies a leading vehicle of the own vehicle (that is, another vehicle running in front of the own vehicle on the same lane).

In an example of this embodiment, the wireless communication device 2 installed to the vehicle C specifies the vehicle B as the leading vehicle.

Herein, the satellite positioning location and the moving direction of the own vehicle and those of the other vehicle(s) at a same time point are correlated with each other in the same manner as described above for the control portion 12 by using a GPS time at which these satellite positioning locations and moving directions were detected.

Besides the foregoing operations, the control portion 22 performs processing (inter-vehicle distance determination processing) to determine an inter-vehicle distance between the own vehicle and the other vehicle(s) on the basis of a distance difference received from the first wireless communication device 1 for vehicle and a satellite positioning location-to-location distance of the own vehicle and the other vehicle(s). Processing involved in the inter-vehicle distance determination processing will be described in detail below.

Figure 4:
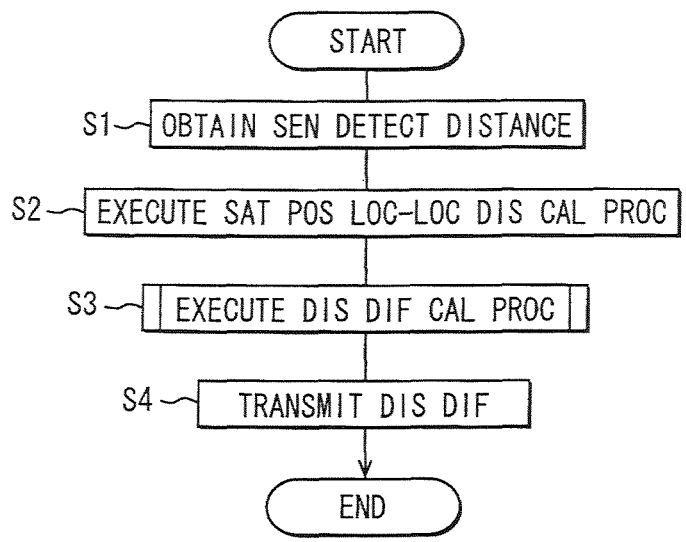
FIG. 4 is a flowchart depicting a flow of processing involved in distance difference calculation processing by a control portion of the wireless communication device for the first vehicle.

A description will now be given to the processing involved in the distance difference calculation processing by the control portion 12 of the wireless communication device 1 for vehicle 1 using FIG. 4. FIG. 4 is a flowchart depicting a flow of the processing involved in the distance difference calculation processing by the control portion 12 of the wireless communication device 1. This flow is started when the ranging sensor 4 detects a distance at least to the leading vehicle or the following vehicle. In this example, a description will be given on the assumption that the control portion 12 has already specified the leading vehicle (vehicle A) and the following vehicle (vehicle C) of the own vehicle (vehicle B) as described above. Also, for ease of description, a description will be given to a case where the distance to the leading vehicle (vehicle A) is detected by the ranging sensor 4 by way of example.

Initially, in Step S1, the control portion 12 obtains the distance (sensor detection distance) to the leading vehicle detected by the ranging sensor 4 and proceeds to Step 2. In Step S2, the control portion 12 performs satellite positioning location-to-location distance calculation processing and then proceeds to Step S3. By the satellite positioning location-to-location distance calculation processing, the control portion 12 calculates a satellite positioning location-to-location distance of the own vehicle and the leading vehicle on the basis of the satellite positioning location of the own vehicle and the satellite positioning location of the leading vehicle at a time point at which the distance to the leading vehicle was detected by the ranging sensor 4. Hence, the control portion 12 is equivalent to the distance calculation means of the first vehicle.

It may be configured in such a manner that the satellite positioning location of the own vehicle and the satellite positioning location of the leading vehicle at a time point at which the distance to the leading vehicle was detected by the ranging sensor 4 is estimated on the basis of the running paths of the own vehicle and the leading vehicle, or one of the satellite positioning locations of the own vehicle and the leading vehicle at a same time point whichever is the newer is used. The satellite positioning locations of the own vehicle and the leading vehicle at a same time point can be specified using the GPS time described above.

Figure 5:
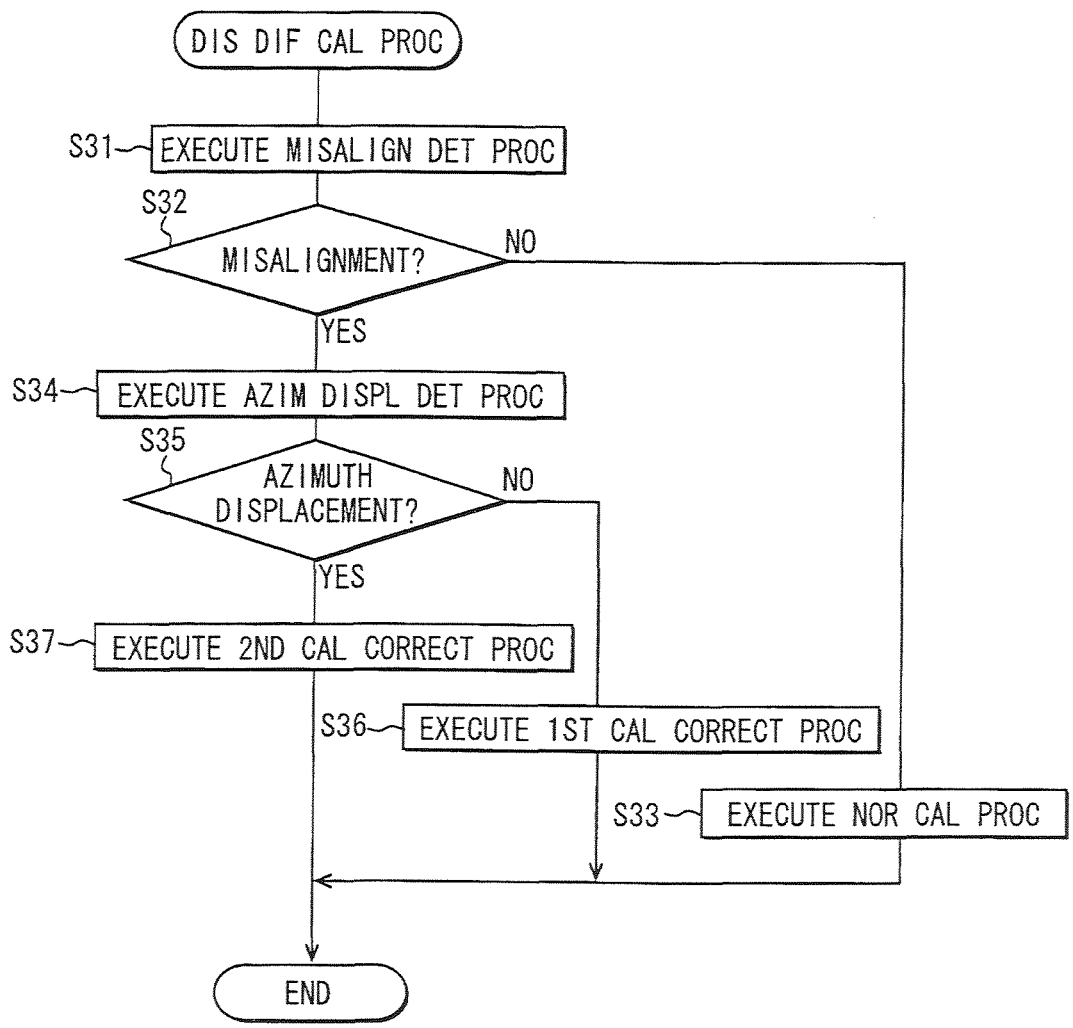
FIG. 5 is a flowchart depicting a flow of the distance difference calculation processing.

In Step S3, the control portion 12 performs distance difference calculation processing and then proceeds to Step S4. A description will now be given briefly to the distance difference calculation processing using the flowchart of FIG. 5. FIG. 5 is a flowchart depicting a flow of the distance difference calculation processing.

Initially, in Step S31, the control portion 12 performs misalignment determination processing and then proceeds to Step S32. By the misalignment determination processing, the control portion 12 determines whether a positional relation between the GPS attachment position and the reference position of the own vehicle and a positional relation between the GPS attachment position and the reference position of the leading vehicle substantially coincides with each other in the vehicle width direction on the basis of the GPS attachment position and the moving direction of the own vehicle and the GPS attachment position and the moving direction of the leading vehicle. Herein, the control portion 12 receives and uses the GPS attachment position of the leading vehicle transmitted from the wireless communication device 1 or the wireless communication device 2 of the leading vehicle.

By the misalignment determination processing, the control portion 12 determines that there is misalignment in a case where the positional relation between the GPS attachment position and the reference position of the own vehicle and the positional relation between the GPS attachment position and the reference position of the leading vehicle do not substantially coincide with each other in the vehicle width direction and determines that there is no misalignment in a case where the positional relations substantially coincide with each other. Hence, the control portion 12 is equivalent to the installment position displacement determination means of the first vehicle. It should be noted that a range within which the positional relations are determined as substantially coinciding with each other can be set arbitrary.

In a case where the control portion 12 determines that there is misalignment by the misalignment determination processing in Step S32 (YES in Step S32), the control portion 12 proceeds to Step S34. In a case where the control portion 12 determines that there is no misalignment by the misalignment determination processing (NO in Step S32), the control portion 12 proceeds to Step S33.

In Step S33, the control portion 12 performs normal calculation processing and then proceeds to Step S4. By the normal calculation processing, the control portion 12 calculates a difference (hereinafter, referred to as the distance difference) between the satellite positioning location-to-location distance calculated by the satellite positioning location-to-location distance calculation processing in Step S2 and the sensor detection distance obtained in Step S1. Hence, the control portion 12 is equivalent to the difference calculation means. In this embodiment, the control portion 12 calculates the distance difference, for example, by subtracting the sensor detection distance from the satellite positioning location-to-location distance. Alternatively, it may be configured in such a manner that the control portion 12 calculates the distance difference by subtracting the satellite positioning location-to-location distance from the sensor detection distance.

Figure 6:
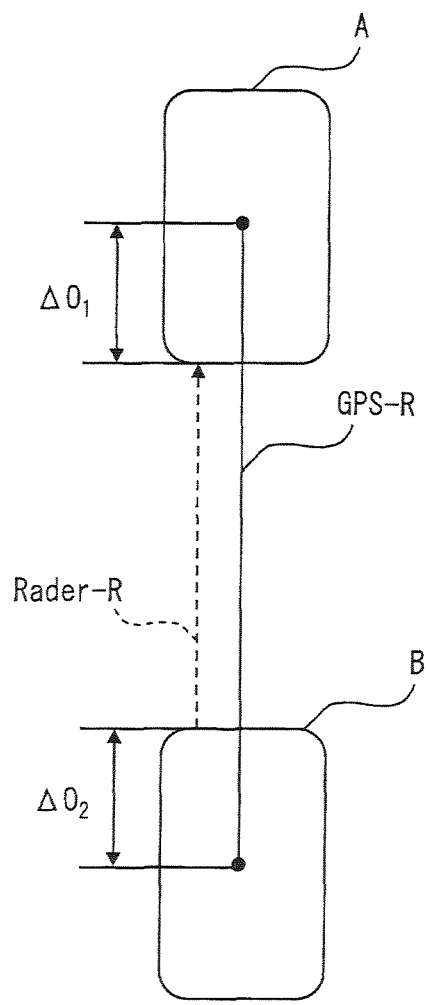
FIG. 6 is a schematic view used to describe a case where there is neither displacement in a vehicle width direction between both installment positions of an own vehicle and a leading vehicle nor azimuth displacement between these vehicles.

By the normal calculation processing, the control portion 12 calculates the distance difference on the assumption that, as is shown in FIG. 6, there is neither displacement between the positional relations (hereinafter, referred to as displacement in the vehicle width direction between the both installment positions) of the GPS attachment position with respect to the reference position of the own vehicle and the leading vehicle nor azimuth displacement between the own vehicle and the leading vehicle. FIG. 6 is a schematic view used to describe a case (hereinafter, referred to the case 1) where there is neither displacement in the vehicle width direction between the both installment positions of the own vehicle and the leading vehicle nor azimuth displacement between these vehicles. In FIG. 6, a capital B denotes the own vehicle and a capital A denotes the leading vehicle. Also, Rader-R denotes the distance to the leading vehicle detected by the ranging sensor 4 and GPS-R denotes the satellite positioning location-to-location distance calculated by the satellite positioning location-to-location distance calculation processing in Step S2. Also, $\Delta O_1$ and $\Delta O_2$ in FIG. 6 denote the distance difference ($\Delta O_1 + \Delta O_2$).

In Step S34, the control portion 12 performs azimuth displacement determination processing and then proceeds to Step S35. By the azimuth displacement determination processing, the control portion 12 determines whether an azimuth angle of the own vehicle and an azimuth angle of the leading vehicle substantially coincide with each other on the basis of the moving direction of the own vehicle and the moving direction of the leading vehicle. Herein, the control portion 12 receives and uses the moving direction of the leading vehicle transmitted from the wireless communication device 1 or the wireless communication device 2 of the leading vehicle. By the azimuth displacement determination processing, the control portion 12 determines that there is azimuth displacement in a case where the azimuth angle of the own vehicle and the azimuth angle of the leading vehicle do not substantially coincide with each other, and determines that there is no azimuth displacement in a case where the former and the latter substantially coincide with each other. Hence, the control portion 12 is equivalent to the azimuth displacement determination means of the first vehicle. It should be noted that a range within which the azimuth angles are determined as substantially coinciding with each other can be set arbitrarily.

In a case where the control portion 12 determines that there is azimuth displacement by the azimuth displacement determination processing in Step S35 (YES in Step S35), the control portion 12 proceeds to Step S37. In a case where the control portion 12 determines that there is no azimuth displacement by the azimuth displacement determination processing (NO in Step S35), the control portion 12 proceeds to Step S36.

In Step S36, the control portion 12 performs first calculation correcting processing and then proceeds to Step 4. By the first calculation correcting processing, the control portion 12 calculates a satellite positioning location-to-location distance (denoted as $I_1$) in which an error caused by the displacement in the vehicle width between the both installment positions of the own vehicle and the leading vehicle is corrected on the basis of the displacement in the vehicle width direction. An error referred to herein means an error from the satellite positioning location-to-location distance of the own vehicle and the leading vehicle in the case where there is no displacement in the width direction.

For example, the control portion 12 calculates the error-corrected satellite positioning location-to-location distance ($I_1$) in accordance with Equation 1 below. In Equation 1 below, GPS-R is the satellite positioning location-to-location distance of the own vehicle and the leading vehicle calculated by the satellite positioning location-to-location distance calculation processing in Step S2. Also, D is the displacement in the vehicle width direction between the both installment positions.

$$I_1 \sqrt{(GPS\text{-}R)^2 - D^2} \tag{1}$$

Figure 7:
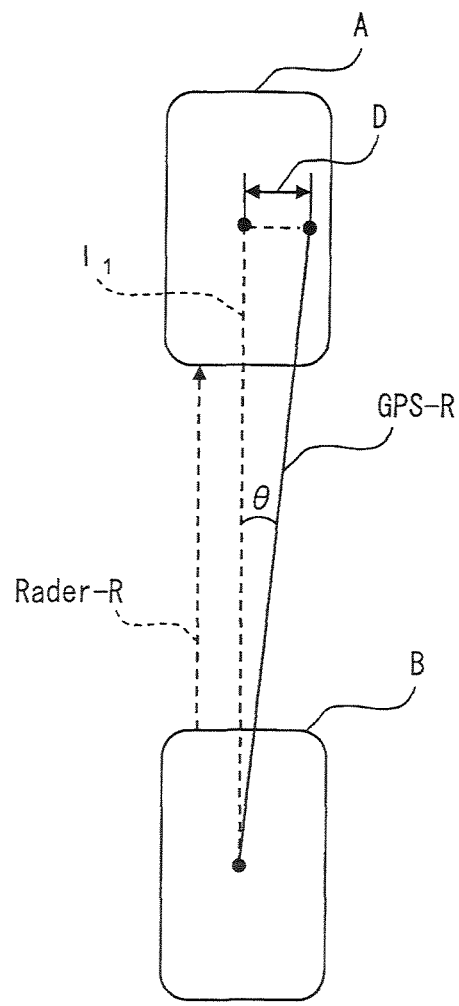
FIG. 7 is a schematic view used to describe a case where there is displacement in the vehicle width direction between both installment positions of the own vehicle and the leading vehicle but there is no azimuth displacement between these vehicles.

By the first calculation correcting processing, the control portion 12 calculates a distance difference used to calculate a distance difference between the satellite positioning location-to-location distance ($I_1$) calculated in accordance with Equation 1 above and the sensor detection distance obtained in Step S1 on the assumption that, as is shown in FIG. 7, there is displacement (D) in the vehicle width direction between the both installment positions but there is no azimuth displacement between the own vehicle and the leading vehicle.

FIG. 7 is a schematic view used to describe a case (hereinafter, referred to as the case 2) where there is displacement in the vehicle width direction between the both installment positions of the own vehicle and the leading vehicle but there is no azimuth displacement between these vehicles. In FIG. 7, a capital B denotes the own vehicle, a capital A denotes the leading vehicle, Rader-R denotes the distance to the leading vehicle detected by the ranging sensor 4, and GPS-R denotes the satellite positioning location-to-location distance calculated by the satellite positioning location-to-location distance calculation processing in Step S2. Also, θ denotes an angle between a line representing the satellite positioning location-to-location distance of the own vehicle and the leading vehicle and a line representing GPS-R in a case where there is no displacement in the vehicle width direction. For ease of description, a description will be given to a case where the GPS attachment position in the vehicle B is a center of the vehicle and the GPS attachment position in the vehicle A is displaced rightward from the center of the vehicle by way of example.

In this embodiment, the control portion 12 calculates the distance difference, for example, by subtracting the sensor detection distance from the satellite positioning location-to-location distance ($I_1$). Alternatively, it may be configured in such a manner that the control portion 12 calculates the distance difference by subtracting the satellite positioning location-to-location distance ($I_1$) from the sensor detection distance.

In Step 37, the control portion 12 performs second calculation correcting processing and then proceeds to Step S4. By the second calculation correcting processing, the control portions 12 calculates a satellite positioning location-to-location distance (denoted as $I_2$) in which an error caused by displacement between the positional relations of the GPS attachment position with respect to the reference position of the own vehicle and the leading vehicle (hereinafter, referred to as the displacement in the vehicle width between the both installment positions) and azimuth displacement between the own vehicle and the leading vehicle on the basis of the displacement in the vehicle width direction and the azimuth displacement. The error referred to herein means an error from the satellite positioning location-to-location distance of the own vehicle and the leading vehicle in the case where there is neither displacement in the vehicle width direction nor azimuth displacement.

To be more specific, the control portion 12 calculates the error-corrected satellite positioning location-to-location distance ($I_2$) in accordance with Equation 2 below. Herein, ΔH is azimuth displacement between the own vehicle and the leading vehicle. Let $H_1$ be the azimuth angle of the own vehicle and $H_2$ be the azimuth angle of the leading vehicle, then ΔH can be obtained in accordance with an equation, $ΔH=|H_1-H_2|$. Also, θ can be found by calculating sin θ in accordance with Equation 3 below.

$$I_2=(GPS\text{-}R)\cos(θ+ΔH) \quad (2)$$

$$\sin θ = D/(GPS\text{-}R) \quad (3)$$

Figure 8:
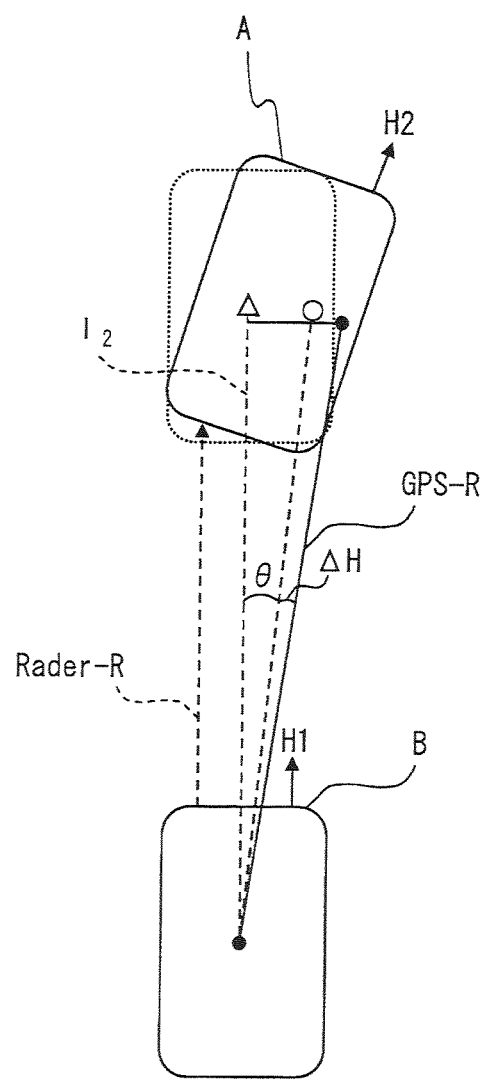
FIG. 8 is a schematic view used to describe a case where there are displacement in the vehicle width direction between both installment positions of the own vehicle and the leading vehicle and azimuth displacement between these vehicles.

By the second calculation correcting processing, the control portion 12 calculates a distance difference used to calculate a distance difference between the satellite positioning location-to-location distance ($I_2$) calculated in accordance with Equation 2 above and the sensor detection distance obtained in Step S1 on the assumption that, as is shown in FIG. 8, there are displacement in the vehicle width direction between the both installment positions and azimuth displacement between the own vehicle and the leading vehicle.

FIG. 8 is a schematic view used to describe a case (hereinafter, referred to as the case 3) where there are displacement in the vehicle width direction between the both installment positions of the own vehicle and the leading vehicle and azimuth displacement between these vehicles. In FIG. 8, a capital B denotes the own vehicle, a capital A denotes the leading vehicle, and Rader-R denotes the distance to the leading vehicle detected by the ranging sensor 4. In FIG. 8, a blank triangle specifies a center of the vehicle of the leading vehicle in the case 1 described above, a blank circle represents the GPS attachment position in the leading vehicle in the case 2, and a black circle specifies the GPS attachment position in the leading vehicle in the case 3. Herein, assume that the GPS attachment position in the leading vehicle in the case 2 and the GPS attachment position in the leading vehicle in the case 3 are at the same position with respect to the reference position.

In this embodiment, the control portion 12 calculates the distance difference, for example, by subtracting the sensor detection distance from the satellite positioning location-to-location distance ($I_2$). Alternatively, it may be configured in such a manner that the control portion 12 calculates the distance difference by subtracting the satellite positioning location-to-location distance ($I_2$) from the sensor detection distance.

Referring to FIG. 4 again, in Step S4, the control portion 12 controls the wireless communication portion 11 to transmit the distance difference calculated by the distance difference calculation processing in Step S3 and ends the flow.

This embodiment has described a case where a distance to the leading vehicle (vehicle A) is detected by the ranging sensor 4 by way of example. It should be appreciated, however, that the disclosure is not necessarily limited to this case. For example, in a case where a distance to the following vehicle (vehicle C) is detected by the ranging sensor 4, it may be configured in such a manner that the control portion 12 calculates a distance difference using the distance to the following vehicle (vehicle C) detected by the ranging sensor 4 and transmits the calculated distance difference. Further, in a case where both a distance to the leading vehicle (vehicle A) and a distance to the following vehicle (vehicle C) are detected by the corresponding ranging sensors 4, it may be configured in such a manner that the control portion 12 calculates distance differences using the respective distances and transmits the both calculated distance differences. Hereinafter, the distance difference calculated for the leading vehicle is referred to as the leading-vehicle-originated distance difference and the distance difference calculated for the following vehicle is referred to as the following-vehicle-originated distance difference.

A description will now be given to processing involved in the inter-vehicle distance determination processing by the control portion 22 of the wireless communication device 2 using FIG. 9. FIG. 9 is a flowchart depicting a flow of the processing involved in the inter-vehicle distance determination processing by the control portion 22 of the wireless communication device 2 for vehicle. This flow is started when the wireless communication portion 21 receives the distance difference from the wireless communication device 1. In this example, a description will be given on the assumption that the control portion 22 has already specified the leading vehicle (vehicle B) of the own vehicle (vehicle C) as described above.

Initially, in Step S101, the control portion 22 obtains the distance difference received at the wireless communication portion 21 and then proceeds to Step S102. In Step S102, the control portion 22 obtains the satellite positioning location from the wireless communication device 1 or the wireless communication device 2 of the leading vehicle via the wireless communication portion 21 and then proceeds to Step S103. In an example of this embodiment, the control portion 22 obtains the satellite positioning location from the wireless communication device 1 of the leading vehicle (vehicle B).

In a case where the communication portion 21 has received either the leading-vehicle-originated distance difference or the following-vehicle-originated distance difference alone, it may be configured in such a manner that the control portion 22 uses only the received distance difference. Meanwhile, in a case where the communication portion 21 has received both of the leading-vehicle-originated distance difference and the following-vehicle-originated distance difference, it may be configured in such a manner that the control portion 22 uses the leading-vehicle-originated distance alone or an average value of the leading-vehicle-originated distance difference and the following-vehicle-originated distance difference. In a case where an average value is used, it may be configured in such a manner that the control portion 22 performs arithmetic average or weighted average by assigning weights to the leading-vehicle-originated distance difference.

In Step S103, the control portion 22 performs sensor detection distance estimation processing and then proceeds to Step S104. By the sensor detection distance estimation processing, the control portion 22 estimates a distance to the other vehicle that is supposed to be detected by the ranging sensor 4 on the basis of the received distance difference and the satellite positioning locations of the own vehicle and the other vehicle. A description will now be given briefly to the sensor detection distance estimation processing using the flowchart of FIG. 10. FIG. 10 is a flowchart depicting a flow of the sensor detection distance estimation processing.

Initially, in Step S131, as in the same manner as in Step S31 described above, the control portion 22 performs the misalignment determination processing and then proceeds to Step S132. Hence, the control portion 22 is equivalent to the second installment position displacement determination means. In a case where the control portion 22 determines that there is misalignment by the misalignment determination processing in Step S132 (YES in Step S132), the control portion 22 proceeds to Step S134. In a case where the control portion 22 determines that there is no misalignment by the misalignment determination processing (NO in Step S132), the control portion 22 proceeds to Step S133.

In Step S133, the control portion 22 performs normal estimation processing and then proceeds to Step S104. By the normal estimation processing, the control portion 22 calculates a satellite positioning location-to-location distance between the satellite positioning location of the own vehicle at the same time point and the satellite positioning location of the leading vehicle obtained in Step S102. Hence, the control portion 22 is equivalent to the second distance calculation means. The satellite positioning locations of the own vehicle and the leading vehicle at the same time point can be specified using the GPS time described above.

The control portion 22 then estimates a distance to the leading vehicle that is supposed to be detected by the ranging sensor 4 on the basis of the calculated satellite positioning location-to-location distance and the distance difference obtained in Step S101. More specifically, the control portion 22 subtracts the distance difference obtained in Step S101 from the calculated satellite positioning location-to-location distance and estimates the value thus found to be the distance to the leading vehicle that is supposed to be detected by the ranging sensor 4. Herein, a description has been given to a case where the distance difference obtained in Step S101 is the distance difference calculated by subtracting the sensor detection distance from the satellite positioning location-to-location distance. It should be appreciated, however, that the disclosure is not necessarily limited to this case. For example, in a case where the distance difference obtained in Step S101 is a distance difference obtained by subtracting the satellite positioning location-to-location distance from the sensor detection distance, it may be configured in such a manner that the control portion 22 adds the distance difference obtained in Step S101 to the calculated satellite positioning location-to-location distance and estimates the value thus found to be the distance to the leading vehicle that is supposed to be detected by the ranging sensor 4.

In Step S134, the control portion 22 performs the azimuth displacement determination processing as in the same manner as in Step S34 described above and then proceeds to Step S135. Hence, the control portion 22 is equivalent to the second azimuth displacement determination means. In a case where the control portion 22 determines that there is azimuth displacement by the azimuth displacement determination processing in Step S135 (YES in Step 135), the control portion 22 proceeds to Step S137. In a case where the control portion 22 determines that there is no azimuth displacement (NO in Step S135), the control portion 22 proceeds to Step S136.

In Step S136, the control portion 22 performs first estimation correcting processing and then proceeds to Step S104. By the first estimation correcting processing, as in the same manner as in Step S36 described above, the control portion 22 calculates the satellite positioning location-to-location distance ($l_1$) in which an error caused by displacement in the vehicle width direction between the both installment positions of the own vehicle and the leading vehicle is corrected on the basis of the displacement in the vehicle width direction. The error referred to herein means an error from the satellite positioning location-to-location distance of the own vehicle and the leading vehicle in the case where there is no displacement in the vehicle width direction.

By the first estimation correcting processing, the control portion 22 estimates a distance to the leading vehicle that is supposed to be detected by the ranging sensor 4 on the basis of the calculated satellite positioning location-to-location distance ($l_1$) and the distance difference obtained in Step S101. More specifically, the control portion 22 subtracts the distance difference obtained in Step S101 from the calculated satellite positioning location-to-location distance ($l_1$) and estimates the value thus found to be the distance to the leading vehicle that is supposed to be detected by the ranging 4. Herein, a description has been given to a case where the distance difference obtained in Step S101 is the distance difference calculated by subtracting the sensor detection distance from the satellite positioning location-to-location distance by way of example. It should be appreciated, however, that the disclosure is not necessarily limited to this case. For example, in a case where the distance difference obtained in Step S101 is a distance difference calculated by subtracting the satellite positioning location-to-location distance from the sensor detection distance, it may be configured in such a manner that the control portion 22 adds the distance difference obtained in Step S101 to the calculated satellite positioning location-to-location distance ($l_1$) and estimates the value thus found to be the distance to the leading vehicle that is supposed to be detected by the ranging sensor 4.

In Step S137, the control portion 22 performs second estimation correcting processing and then proceeds to Step S104. By the second estimation correcting processing, as in the same manner as in Step S37 described above, the control portion 22 calculates the satellite positioning location-to-location distance ($l_2$) in which an error caused by displacement in the vehicle width direction between the both installment positions of the own vehicle and the leading vehicle and the azimuth displacement between these vehicles is corrected on the basis of the displacement in the vehicle width direction and the azimuth displacement. The error referred to herein means an error from the satellite positioning location-to-location distance of the own vehicle and the leading vehicle in the case where there is neither the displacement in the vehicle width direction nor the azimuth displacement.

By the second estimation correcting processing, the control portion 22 estimates a distance to the leading vehicle that is supposed to be detected by the ranging sensor 4 on the basis of the calculated satellite positioning location-to-location distance ($l_2$) and the distance difference obtained in Step S101. More specifically, the control portion 22 subtracts the distance difference obtained in Step S101 from the calculated satellite positioning location-to-location distance ($l_2$) and estimates the value thus found to be the distance to the leading vehicle that is supposed to be detected by the ranging sensor 4. Herein, a description has been given to a case where the distance difference obtained in Step S101 is a distance difference calculated by subtracting the sensor detection distance from the satellite positioning location-to-location distance by way of example. It should be appreciated, however, that the disclosure is not necessarily limited to this case. For example, in a case where the distance difference obtained in Step S101 is a distance difference calculated by subtracting the satellite positioning location-to-location distance from the sensor detection distance, it may be configured in such a manner that the control portion 22 adds the distance difference obtained in Step S101 to the calculated satellite positioning location-to-location distance ($l_2$) and estimates the value thus found to be the distance to the leading vehicle that is supposed to be detected by the ranging sensor 4.

Referring to FIG. 9 again, in Step S104, the control portion 22 determines the distance estimated by the sensor detection distance estimation processing in Step S103 as the inter-vehicle distance between the own vehicle and the leading vehicle and ends the flow. Hence, the control portion 22 is equivalent to the inter-vehicle determination means.

The distance difference transmitted from the wireless communication device 1 is, as has been described, a difference between a satellite positioning location-to-location distance of a vehicle equipped with the wireless communication device 1 and a leading or following vehicle (hereinafter, referred to the preceding or succeeding vehicle) and a distance to the preceding or succeeding vehicle detected by the ranging sensor 4. Hence, with the use of this distance difference, it becomes possible to estimate a distance to the leading vehicle that is supposed to be detected by the ranging sensor 4 on the basis of the satellite positioning location-to-location distance of the own vehicle and the preceding or subsequent vehicle. Also, the ranging sensor 4 is capable of detecting an inter-vehicle distance between the own vehicle and the preceding or succeeding vehicle more precisely. Hence, by determining the value estimated as the distance to the leading vehicles that is supposed to be detected by the ranging sensor 4, it becomes possible to detect the inter-vehicle distance between the own vehicle and the leading vehicle with accuracy. Hence, according to the configuration of this embodiment, even when a vehicle is not equipped with the ranging sensor 4, it becomes possible to detect an inter-vehicle distance between this vehicle and a leading vehicle with accuracy more easily by merely calculating the satellite positioning location-to-location distance.

In a case where there is displacement in the vehicle width direction between the installment positions of the GPS receivers 35 installed to each of the own vehicle and the preceding or succeeding vehicle or there is azimuth displacement between these vehicles, a satellite positioning location-to-location distance of the own vehicle and the preceding or succeeding vehicle varies in a measure comparable to the displacement. Naturally, an error also occurs in the distance difference in a measure comparable to the displacement. To eliminate this inconvenience, according to the configuration of this embodiment, the first wireless communication device 1 for vehicle calculates the distance difference by correcting this error. It thus becomes possible to calculate and transmit the error-suppressed distance difference.

As has been described, in a case where there is displacement in the vehicle width direction between the installment positions of the GPS receivers 35 installed to each of the own vehicle and the leading or there is azimuth displacement between these vehicles, a satellite positioning location-to-location distance of the own vehicle and the preceding or succeeding vehicle varies in a measure comparable to the displacement (that is, an error occurs). To eliminate this inconvenience, according to the configuration of this embodiment, the wireless communication device 2 calculates the satellite positioning location-to-location distance of the own vehicle and the leading vehicle by correcting this error. It thus becomes possible to determine an inter-vehicle distance using the error-suppressed satellite positioning location-to-location distance. Also, the distance difference received from the wireless communication device 1 is the distance difference in which an error caused by displacement in the vehicle width direction and an error caused by azimuth displacement are suppressed as described above. This also makes it possible determine the inter-vehicle distance more precisely.

This embodiment has described a configuration in which the wireless communication device 1 or the wireless communication device 2 corrects an error in the distance difference or the satellite positioning location-to-location distance caused by displacement in the vehicle width direction between the both installment positions of the own vehicle and the leading vehicle or azimuth displacement between these vehicles. It should be appreciated, however, that the disclosure is not necessarily limited to this configuration. For example, it may be configured in such a manner that these errors are not corrected at all. It is, however, preferable to correct these errors in terms of detection accuracy of an inter-vehicle distance between the own vehicle and the leading vehicle.

Also, this embodiment has described a configuration in which the wireless communication device 2 installed to a vehicle not equipped with the ranging sensor 4 performs processing involved in the sensor detection distance estimation processing and determines an inter-vehicle distance between the own vehicle and the leading vehicle. It should be appreciated, however, that the disclosure is not necessarily limited to this configuration. For example, it may be configured in such a manner that the wireless communication device 1 installed to a vehicle equipped with the ranging sensor 4 performs processing involved in the sensor detection distance estimation processing and determines an inter-vehicle distance between the own vehicle and the leading vehicle.

The reason for this alternative configuration is to address a case where a vehicle equipped with the ranging sensor 4 fails to detect an inter-vehicle distance between the own vehicle and the leading vehicle depending on cruising environments, such as a case where the leading vehicle is on a curve or slope and a probing wave from the ranging sensor 4 misses the leading vehicle. In a case where a vehicle equipped with the ranging sensor 4 fails to detect an inter-vehicle distance between the own vehicle and the leading vehicle using the ranging sensor 4 as described above, it may be configured in such a manner that the wireless communication device 1 performs processing involved in the sensor detection distance estimation processing and determines an inter-vehicle distance between the own vehicle and the leading vehicle. In this case, it may be configured in such a manner that the control portion 22 performs the same processing as the processing performed by the control portion 12.

According to the configuration as above, even in a case where a vehicle equipped with the ranging sensor 4 is in cruising environments where the vehicle fails to detect an inter-vehicle distance between the own vehicle and the leading vehicle using the ranging sensor 4, it becomes possible to detect an inter-vehicle distance between the own vehicle and the leading vehicle with accuracy more easily by merely calculating the satellite positioning location-to-location distance. Hence, an inter-vehicle distance between the own vehicle and the leading vehicle can be detected with accuracy in a stable manner more easily. The cruising environments where an inter-vehicle distance between the own vehicle and the leading vehicle cannot be detected by the ranging sensor 4 include a case where a probing wave from the ranging sensor 4 misses the leading vehicle on a curve or slope.

Further, the embodiments above have described a configuration in which the cruise-assist system 100 includes one wireless communication device 1 and two wireless communication devices 2. It should be appreciated, however, that the disclosure is not necessarily limited to this configuration. It may be configured in such a manner that a reasonable number of the wireless communication devices 1 and the wireless communication devices 2 are included as long as these wireless communication devices include the wireless communication device 1 for vehicle 1 installed to a given vehicle and the wireless communication device 1 or the wireless communication device 2 installed to a following vehicle of this vehicle.

With the configuration in which the cruise-assist system 100 includes two or more wireless communication devices 1, in a case where the wireless communication device 2 receives the distance difference from more than one wireless communication device 1, it may be configured in such a manner that an inter-vehicle distance is determined on the basis of the distance difference received from the wireless communication device 1 installed to a vehicle at a nearest location to the current location of the own vehicle.

In this case, it may be configured in a manner as follows. That is, the control portion 22 specifies a vehicle at a nearest location to the current location of the own vehicle on the basis of relative positions of the other individual vehicles with respect to the own vehicle found by the control portion 22 as described above. Then, the control portion 22 selects the distance difference received from the wireless communication device 1 installed to the specified vehicle and determines an inter-vehicle distance using the selected distance difference. Hence, the control portion 22 is equivalent to the selection means.

An error in the satellite positioning location positioned by the GPS receiver 35 varies with a place where the location is positioned. Accordingly, it is highly likely that a distance difference between the satellite positioning location-to-location distance and a distance to the preceding or succeeding vehicle detected by the ranging sensor 4 is more accurate when calculated with a nearby vehicle closer to the own vehicle. According to the configuration described above, an inter-vehicle distance between the own vehicle and the leading vehicle is determined using the distance difference calculated in the wireless communication device 1 of a nearby other vehicle closer to the own vehicle. Hence, an inter-vehicle distance between the own vehicle and the leading vehicle can be determined using the distance difference with a higher degree of accuracy. It thus becomes possible to determine an inter-vehicle distance between the own vehicle and the leading vehicle more precisely.

With the configuration in which the cruise-assist system 100 includes two or more wireless communication devices 1, in a case where the wireless communication device 2 has received the distance difference from more than one wireless communication device 1, it may be configured as follows. That is, greater weights are assigned to the distance difference received from the wireless communication device 1 installed to a vehicle at a location nearer to the current location of the own vehicle and a plurality of distance differences are subjected to weighted average. Accordingly, an inter-vehicle distance is determined using a value of the weighted average distance difference.

In this case, it may be configured in such a manner that the control portion 22 specifies a vehicle at a nearest location to the current location of the own vehicle on the basis of relative locations of the other individual vehicles with respect to the own vehicle found by the control portion 22 as described above. The control portion 22 assigns greater weights to the distance difference received from the wireless communication device 1 installed to a vehicle at a location nearer to the current location of the own vehicle and performs weighted average on a plurality of distance differences. The control portion 22 thus determines an inter-vehicle distance using the weighted average distance difference. Hence, the control portion 22 is equivalent to the weighted average means.

As has been described above, it is highly likely that a distance difference calculated with a nearby other vehicle closer to the own vehicle is more accurate. In light of this, according to the configuration described above, in a case where there is an abnormal value markedly different from values of other distance differences, greater weights are assigned to the distance difference that are highly likely to have a higher degree of accuracy by performing weighted average while suppressing influences of such an abnormal value. Accordingly, a distance difference that is highly likely to have a higher degree of accuracy can be obtained. It thus becomes possible to determine an inter-vehicle distance between the own vehicle and the leading vehicle more precisely using the weighted average distance difference.

While a description has been given to a configuration in which the control portion 22 performs weighted average on a plurality of distance differences, it should be appreciated, however, that the disclosure is not necessarily limited to this configuration. For example, it may be configured in such a manner that the control portion 22 determines a representative value of a plurality of distance differences, such as an arithmetic average value and an intermediate value, and determines an inter-vehicle distance using the value thus determined. Hence, the control portion 22 is equivalent to the representative value determination means.

In a case where the wireless communication device 2 receives the distance difference from more than one wireless communication device 1 as in the embodiments described above, the control portion 22 stores the respective distance differences in a memory, such as an EEPROM, for a certain period, so that the control portion 22 can use the respective distance differences later. Alternatively, when the distance difference is received from the wireless communication device 1 installed in the same vehicle, the control portion 22 may overwrite the new distance difference on the old distance difference for this vehicle.

While the embodiment above has described a configuration in a case where the wireless communication device 2 receives the distance difference from more than one wireless communication device 1, it should be appreciated that the configuration is the same in a case where the wireless communication device 1 receives the distance difference from more than one wireless communication device 1.

The above disclosure has the following aspects.

According to a first aspect of the present disclosure, a drive assist system for vehicles includes: a wireless communication device mounted on a first vehicle equipped with a ranging sensor for detecting a distance to an object around the first vehicle and a receiver of a satellite positioning system for successively positioning a current location of the first vehicle; and a wireless communication device mounted on a second vehicle equipped with a receiver of the satellite positioning system for successively positioning a current location of the second vehicle. The wireless communication device of the first vehicle wirelessly communicates with the wireless communication device of the second vehicle, and the wireless communication device of the second vehicle wirelessly communicates with a wireless communication device mounted on a third vehicle equipped with a receiver of the satellite positioning system. The wireless communication device of the second vehicle successively transmits information about the current location of the second vehicle. The wireless communication device of the first vehicle includes: a distance calculation device for calculating a satellite positioning distance between the first vehicle and the second vehicle based on the current location of the second vehicle and the current location of the first vehicle obtained by the receiver of the first vehicle when the wireless communication device of the first vehicle receives the information about the current location of the second vehicle from the wireless communication device in the second vehicle, which is a leading vehicle or a following vehicle of the first vehicle; and a difference calculation device for calculating a distance difference between the satellite positioning distance calculated by the distance calculation device and the distance to the second vehicle obtained by the ranging sensor. The wireless communication device of the first vehicle transmits information about the distance difference, calculated by the difference calculation device, to the wireless communication device of the second vehicle. The wireless communication device of the second vehicle includes: a distance calculation device for calculating a satellite positioning distance between the second vehicle and the third vehicle based on the current location of the third vehicle and the current location of the second vehicle obtained by the receiver of the second vehicle when the wireless communication device of the second vehicle receives information about the current location of the third vehicle from the wireless communication device in the third vehicle, which is a leading vehicle of the second vehicle; and an inter-vehicle distance determination device for estimating an inter-vehicle distance between the second vehicle and the third vehicle based on the distance difference and the satellite positioning distance calculated by the second distance calculation device of the second vehicle when the wireless communication device of the second vehicle receives the information about the distance difference from the wireless communication device of the first vehicle, assuming that the inter-vehicle distance is detected by a ranging sensor in the second vehicle.

In the above system, the distance difference transmitted from the wireless communication device 1 is a difference between the satellite positioning location-to-location of the own vehicle and the preceding or subsequent vehicle and the distance to the preceding or succeeding vehicle detected by the ranging sensor. Also, because the distance measured by the ranging sensor is relatively precise, the distance difference is chiefly attributed to a positioning error. Hence, it is thought that the distance difference occurs in substantially the same manner around the vehicle that has transmitted the distance difference. Hence, in a case where the wireless communication device of the second vehicle different from the first vehicle that has transmitted the distance difference receives the distance difference, it becomes possible to determine a distance to the leading vehicle on the basis of the distance difference and the satellite positioning location-to-location distance of the second vehicle and the leading vehicle with accuracy as high as that in the case where the distance is detected by the ranging sensor. Hence, according to the configuration above, even for a vehicle not equipped with the ranging sensor, it becomes possible to detect an inter-vehicle distance between the own vehicle and the leading vehicle with accuracy more easily on the basis of the satellite positioning location-to-location distance. Besides the case as above, even in a case where a vehicle equipped with the ranging sensor is in cruising environments in which the vehicle fails to detect an inter-vehicle distance between the own vehicle and the preceding or succeeding vehicle with the ranging sensor, it becomes possible to detect the inter-vehicle distance between the own vehicle and the leading vehicle with accuracy more easily on the basis of the satellite positioning location-to-location distance. Hence, according to the configuration above, the inter-vehicle distance between the own vehicle and the leading vehicle can be determined with accuracy more easily. It thus becomes possible to detect the inter-vehicle distance between the own vehicle and the leading vehicle with accuracy more easily while enhancing versatility.

Alternatively, each of the wireless communication device 1 and the wireless communication device 2 may store information about an installment position of a respective receiver installed to a corresponding vehicle. The wireless communication device 2 transmits the information about the current location of the second vehicle together with an installment position of the receiver of the second vehicle and a driving direction of the second vehicle to the wireless communication device of the first vehicle. The wireless communication device of the first vehicle further includes an installment position displacement determination device for determining whether there is a displacement in a vehicle width direction between an installment position of the receiver of the first vehicle and the installment position of the receiver of the second vehicle, based on the installment position of the receiver of the first vehicle, a driving direction of the first vehicle, the installment position of the receiver of the second vehicle, and the driving direction of the second vehicle. The difference calculation device corrects an error caused by the displacement, based on an amount of the displacement, so that the difference calculation device calculates a corrected distance difference when the first installment position displacement determination device determines that there is the displacement in the vehicle width direction between the installment position of the receiver of the first vehicle and the installment position of the receiver of the second vehicle. In a case where there is displacement in the vehicle width direction between the installment positions of the receivers installed to each of the own vehicle and the preceding or subsequent vehicle, the satellite positioning location-to-location distance increases in a measure comparable to the displacement. Naturally, an error also occurs in the distance difference in a measure comparable to the displacement. To eliminate this inconvenience, according to the above configuration, the wireless communication device for the first vehicle calculates the distance difference by correcting the error. Accordingly, it becomes possible to calculate and transmit the error-suppressed distance difference. Hence, at the end of the wireless communication device for the second vehicle that has received the distance difference, because the inter-vehicle distance can be determined by reducing influences of the error, it becomes possible to detect the inter-vehicle distance between the own vehicle and the leading vehicle with a higher degree of accuracy more easily.

Alternatively, each of the wireless communication device 1 and the wireless communication device 2 may obtain information about an azimuth angle of a respective vehicle. The wireless communication device 2 transmits the information about the current location of the second vehicle together with an azimuth angle of the second vehicle. The wireless communication device 1 further includes an azimuth displacement determination device for determining whether there is an azimuth displacement between an azimuth angle of the first vehicle and an azimuth angle of the second vehicle, based on the azimuth angle received from the wireless communication device 2 and the azimuth of the first vehicle. The difference calculation device corrects an error caused by the displacement and the azimuth displacement, based on an amount of the displacement and an amount of the azimuth displacement, so that the difference calculation device calculates a corrected distance difference when the installment position displacement determination device of the first vehicle determines that there is the displacement in the vehicle width direction, and the azimuth displacement determination device of the first vehicle determines that there is the azimuth displacement. In a case where there is not only displacement in the vehicle width direction between the installment positions of the receivers installed to each of the own vehicle and the preceding or succeeding vehicle but also azimuth displacement between the own vehicle and the preceding or succeeding vehicle, an error between the satellite positioning location-to-location distance and the distance detected by the ranging sensor increases in a measure comparable to the azimuth displacement. Naturally, an error also occurs in the distance difference in a measure comparable to the azimuth difference. To eliminate this inconvenience, according to the above configuration, the wireless communication device for the first vehicle calculates the distance difference by correcting an error caused by the displacement in the vehicle width direction and the azimuth displacement. Accordingly, it becomes possible to transmit the error-suppressed distance difference. Hence, at the end of the wireless communication device for the second vehicle that has received the distance difference, because the inter-vehicle distance can be determined by reducing influences of the error, it becomes possible to detect the inter-vehicle distance between the own vehicle and the leading vehicle with a higher degree of accuracy more easily.

Alternatively, the wireless communication device 2 may further include an installment position displacement determination device for determining whether there is displacement in a vehicle width direction between the installment position of the receiver of the second vehicle and an installment position of a receiver of a third vehicle, based on the installment position of the receiver of the second vehicle, the driving direction of the second vehicle, the installment position of the receiver of the third vehicle, and the driving direction of the third vehicle, when the wireless communication device of the second vehicle receives the information about the current location from the wireless communication device in the third vehicle. The distance calculation device of the second vehicle corrects an error caused by the displacement, based on an amount of the displacement, so that the distance calculation device of the second vehicle calculates a corrected satellite positioning distance when the installment position displacement determination device of the second vehicle determines that there is the displacement in the vehicle width direction. The inter-vehicle distance determination device estimates the inter-vehicle distance with using the corrected satellite positioning distance. As has been described, in a case where there is displacement in the vehicle width direction between the installment positions of the receivers installed to each of the own vehicle and the leading vehicle, the satellite positioning location-to-location distance increases in a measure comparable to the displacement (that is, an error occurs). To eliminate this inconvenience, according to the above configuration, the wireless communication device for the second vehicle calculates the satellite positioning location-to-location distance by correcting the error using the distance calculation means of the second vehicle. Hence, the inter-vehicle distance determination means becomes able to determine the inter-vehicle distance using to the error-suppressed satellite positioning location-to-location distance. In addition, the distance difference received from the wireless communication device for the first vehicle is the distance difference in which the error caused by the displacement in the vehicle width direction is suppressed. Hence, according to the above configuration, the inter-vehicle distance determination means becomes able to determine the inter-vehicle distance more precisely.

Alternatively, the wireless communication device of the second vehicle may further include an azimuth displacement determination device for determining whether there is an azimuth displacement between the second vehicle and the third vehicle, based on the azimuth angle of the second vehicle and the azimuth angle of the third vehicle, when the wireless communication device of the second vehicle receives the information about the current location of the third vehicle from the wireless communication device in the third vehicle. The distance calculation device of the second vehicle corrects an error caused by the displacement in the vehicle width direction and the azimuth displacement, based on an amount of the displacement in the vehicle width direction and an amount of the azimuth displacement, so that the distance calculation device of the second vehicle calculates a corrected satellite positioning distance, when the installment position displacement determination device of the second vehicle determines that there is the displacement in the vehicle width direction between the installment position of the receiver in the second vehicle and the installment position of the receiver in the third vehicle, and further, the azimuth displacement determination device of the second vehicle determines that there is the azimuth displacement between the second vehicle and the third vehicle. The inter-vehicle distance determination device estimates the inter-vehicle distance with using the corrected satellite positioning distance. As has been described, in a case where there is not only the displacement in the vehicle width direction between the installment positions of the receivers installed to each of the own vehicle and the leading vehicle, but also the azimuth displacement between the own vehicle and the leading vehicle, an error of the satellite positioning location-to-location increases in a measure comparable to the azimuth displacement. To eliminate this inconvenience, according to the above configuration, the wireless communication device for the second vehicle calculates the satellite positioning location-to-location distance by correcting an error caused by the displacement in the vehicle width direction and the azimuth direction using the distance calculation means. Accordingly, the inter-vehicle distance determination means becomes able to determine the inter-vehicle distance using the error-suppressed satellite positioning location-to-location distance. In addition, the distance difference received from the wireless communication device for the first vehicle is the distance difference in which the error caused by the azimuth displacement is suppressed. Hence, according to the above configuration, the inter-vehicle distance determination means becomes able to determine the inter-vehicle distance more precisely. An error of the satellite positioning location positioned by the receiver of the satellite positioning system varies with a place where the location is positioned. Hence, it is highly likely that the distance difference between the satellite positioning location-to-location distance and the distance to the preceding or succeeding vehicle detected by the ranging sensor is more accurate when calculated with a nearby vehicle closer to the own vehicle.

Alternatively, the wireless communication device of the first vehicle may transmit the information about the distance difference together with the information about the current location of the first vehicle. The wireless communication device of the second vehicle further includes a selection device for selecting one of the informations from a corresponding wireless communication device of a first vehicle, which is the nearest device of the second vehicle at the current location, based on more than one information about the current location of the first vehicle and the current location of the second vehicle, when the wireless communication device of the second vehicle receives more than one information about the distance difference from more than one wireless communication device. The inter-vehicle distance determination device estimates the inter-vehicle distance based on the distance difference of a selected one of the informations and the satellite positioning distance calculated by the distance calculation device of the second vehicle. As has been described, it is highly likely that the distance difference calculated with a nearby vehicle closer to the own vehicle is more accurate. Hence, according to the above configuration, the inter-vehicle distance determination means becomes able to determine the inter-vehicle more precisely using the selected distance difference.

Alternatively, the wireless communication device of the first vehicle may transmit the information about the distance difference together with the information about the current location of the first vehicle. The wireless communication device of the second vehicle further includes a weighted average device for assigning a greater weight to the information of the distance difference received from a corresponding wireless communication device, which is a nearer device of the second vehicle at the current location, based on more than one information about the current location of the first vehicle and the current location of the second vehicle, when the wireless communication device of the second vehicle receives more than one information about the distance difference from more than one wireless communication device, and for calculating a weighted average on a plurality of distance differences. The inter-vehicle distance determination device estimates the inter-vehicle distance based on the weighted average on the distance differences and the satellite positioning distance calculated by the second distance calculation device. As has been described, it is highly likely that the distance difference calculated with a nearby vehicle closer to the own vehicle is more accurate. Hence, according to the above configuration, in a case where there is an abnormal value markedly different from values of other distance differences, greater weights are assigned to a distance difference that is highly likely to have a higher degree of accuracy by performing weighted average while suppressing influences of such an abnormal value. Accordingly, a distance difference that is highly likely to have a higher degree of accuracy can be obtained. Hence, the inter-vehicle distance determination means becomes able to determine the inter-vehicle distance more precisely using the weighted average distance difference.

Alternatively, the wireless communication device of the second vehicle may further include a representative value determination device for determining a representative value from a plurality of received distance differences, when the wireless communication device of the second vehicle receives more than one information about the distance difference from more than one wireless communication device. The inter-vehicle distance determination device estimates the inter-vehicle distance based on the representative value of the received distance differences and the satellite positioning distance calculated by the distance calculation device of the second vehicle. Further, the representative value may be an intermediate value of a plurality of the distance differences or an arithmetic average of a plurality of the distance differences.

According to a second aspect of the present disclosure, a wireless communication device installed to a first vehicle equipped with a ranging sensor for detecting a distance to an object around the first vehicle and a receiver of a satellite positioning system for positioning a current location of the first vehicle, the wireless communication device wirelessly communicating with a wireless communication device installed to a second vehicle equipped with a receiver of the satellite positioning system for positioning a current location of the second vehicle, and receiving information about the current location of the second vehicle from the wireless communication device of the second vehicle, the wireless communication device includes: a distance calculation device for calculating a satellite positioning distance between the first vehicle and the second vehicle based on the current location of the second vehicle and the current location of the first vehicle obtained by the receiver of the first vehicle, when the wireless communication device receives the information about the current location of the second vehicle from the wireless communication device in the second vehicle, which is a leading vehicle or a following vehicle of the first vehicle; and a difference calculation device for calculating a distance difference between the satellite positioning distance calculated by the distance calculation device of the first vehicle and the distance to the second vehicle obtained by the ranging sensor. The wireless communication device transmits information about the distance difference, calculated by the difference calculation device.

In the above device, the distance difference calculated by the difference calculation means and transmitted from the wireless communication device for the first vehicle is a difference between the satellite positioning location-to-location distance of the own vehicle and the preceding or subsequent vehicle and the distance to the preceding or succeeding vehicle detected by the ranging sensor. Hence, with the use of this distance difference, as has been described above, it becomes possible to determine an inter-vehicle between the own vehicle and the leading vehicle with accuracy that is supposed to be detected by the ranging sensor on the basis of the satellite positioning location-to-location distance of the own vehicle and the preceding or succeeding vehicle. Hence, according to the configuration above, even when a vehicle is not equipped with the ranging sensor, by receiving the transmitted distance difference, it becomes possible to detect an inter-vehicle distance between the own vehicle and the leading vehicle with accuracy more easily on the basis of the received distance difference and the satellite positioning location-to-location distance. Besides the case as above, even in a case where a vehicle equipped with the ranging sensor is in cruising environments in which the vehicle fails to detect an inter-vehicle distance between the own vehicle and the leading vehicle with the ranging sensor, by receiving the transmitted distance difference, it becomes possible to detect the inter-vehicle distance between the own vehicle and the leading vehicle with accuracy more easily on the basis of the received distance difference and the satellite positioning location-to-location distance. Hence, according to the configuration above, it becomes possible to detect the inter-vehicle distance between the own vehicle and the leading vehicle with accuracy more easily while enhancing versatility.

According to a third aspect of the present disclosure, a wireless communication device installed to a second vehicle equipped with a receiver of a satellite positioning system for positioning a current location of the second vehicle, the wireless communication device wirelessly communicating with a wireless communication device installed to a first vehicle equipped with a ranging sensor for detecting a distance to an object around the first vehicle and a receiver of the satellite positioning system for positioning a current location of the first vehicle, communicating with a wireless communication device installed to a third vehicle equipped with a receiver of the satellite positioning system for positioning a current location of the third vehicle, and receiving information about a distance difference, transmitted from and calculated by the wireless communication device of the first vehicle, between a satellite positioning distance from the first vehicle to the second vehicle and a distance from the first vehicle to the second vehicle obtained by the ranging sensor, wherein the satellite positioning distance is calculated by the wireless communication device of the first vehicle based on the current location of the first vehicle calculated by the receiver of the first vehicle and the second current location of the second vehicle calculated by the receiver of the second vehicle, the wireless communication device includes: a distance calculation device for calculating a satellite positioning distance between the second vehicle and the third vehicle based on the current location of the third vehicle and the current location of the second vehicle obtained by the receiver of the second vehicle when the wireless communication device of the second vehicle receives information about the current location of the third vehicle from the wireless communication device in the third vehicle, which is a leading vehicle of the second vehicle; and an inter-vehicle distance determination device for estimating an inter-vehicle distance between the second vehicle and the third vehicle based on the distance difference and the satellite positioning distance calculated by the calculation device of the second vehicle when the wireless communication device of the second vehicle receives the information about the distance difference from the wireless communication device of the first vehicle, assuming that the inter-vehicle distance is detected by a ranging sensor in the second vehicle.

In the above device, according to this configuration, the distance difference transmitted from the wireless communication device for the first vehicle is a difference between the satellite positioning location-to-location of the own vehicle and the preceding or subsequent vehicle and the distance to the preceding or succeeding vehicle detected by the ranging sensor. Hence, with the use of this distance difference, as described above, it becomes possible to determine the inter-vehicle distance between the own vehicle and the leading vehicle that is supposed to be detected by the ranging sensor with accuracy on the basis of the satellite positioning location-to-location distance of the own vehicle and the preceding or subsequent vehicle Hence, according to this configuration, even when a vehicle is not equipped with the ranging senor, the inter-vehicle distance between the own vehicle and the leading vehicle can be detected with accuracy more easily on the basis of the distance difference and the satellite positioning location-to-location distance. Besides the case as above, even in a case where a vehicle equipped with the ranging sensor is in cruising environments in which the vehicle fails to detect an inter-vehicle distance between the own vehicle and the preceding or succeeding vehicle with the ranging sensor, the inter-vehicle distance between the own vehicle and the leading vehicle can be detected with accuracy more easily on the basis of the distance difference and the satellite positioning location-to-location distance. Hence, according to the configuration above, it becomes possible to detect the inter-vehicle distance between the own vehicle and the leading vehicle with accuracy more easily while enhancing versatility.

According to a fourth aspect of the present disclosure, a drive assist system for vehicles includes: a wireless communication device mounted on a first vehicle equipped with a ranging sensor for detecting a distance to an object around the first vehicle and a receiver of a satellite positioning system for successively positioning a current location of the first vehicle; a wireless communication device mounted on a second vehicle equipped with a receiver of the satellite positioning system for successively positioning a second current location of the second vehicle; a wireless communication device mounted on a third vehicle equipped with a receiver of the satellite positioning system for successively positioning a current location of the third vehicle, which is a leading vehicle or a following vehicle of the first vehicle. The wireless communication device of the first vehicle wirelessly communicates with the wireless communication device of the second vehicle and the wireless communication device of the third vehicle. The wireless communication device of the second vehicle successively transmits information about the current location of the second vehicle. The wireless communication device includes: a distance calculation device for calculating a satellite positioning distance between the first vehicle and the second vehicle based on the current location of the second vehicle and the current location of the first vehicle obtained by the receiver of the first vehicle when the wireless communication device of the first vehicle receives the information about the current location of the second vehicle from the wireless communication device in the second vehicle, which is a leading vehicle or a following vehicle of the first vehicle; and a difference calculation device for calculating a distance difference between the satellite positioning distance calculated by the distance calculation device of the first vehicle and the distance to the second vehicle obtained by the ranging sensor. The wireless communication device of the first vehicle transmits information about the distance difference, calculated by the difference calculation device, to a wireless communication device of the third vehicle. The wireless communication device of the third vehicle includes: a distance calculation device for calculating a satellite positioning distance between the first vehicle and the third vehicle based on the current location of the third vehicle and the current location of the first vehicle obtained by the receiver of the first vehicle when the wireless communication device of the third vehicle receives information about the current location of the first vehicle from the wireless communication device in the first vehicle; and an inter-vehicle distance determination device for estimating an inter-vehicle distance between the first vehicle and the third vehicle based on the distance difference and the satellite positioning distance calculated by the distance calculation device of the second vehicle when the wireless communication device of the third vehicle receives the information about the distance difference from the wireless communication device of the first vehicle, assuming that the inter-vehicle distance is detected by a ranging sensor in the third vehicle.

In the above device, even for a vehicle not equipped with the ranging sensor, it becomes possible to detect an inter-vehicle distance between the own vehicle and the leading vehicle with accuracy more easily on the basis of the satellite positioning location-to-location distance. Besides the case as above, even in a case where a vehicle equipped with the ranging sensor is in cruising environments in which the vehicle fails to detect an inter-vehicle distance between the own vehicle and the preceding or succeeding vehicle with the ranging sensor, it becomes possible to detect the inter-vehicle distance between the own vehicle and the leading vehicle with accuracy more easily on the basis of the satellite positioning location-to-location distance. Hence, according to the configuration above, the inter-vehicle distance between the own vehicle and the leading vehicle can be determined with accuracy more easily. It thus becomes possible to detect the inter-vehicle distance between the own vehicle and the leading vehicle with accuracy more easily while enhancing versatility.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A drive assist system for vehicles comprising:
a wireless communication device mounted on a first vehicle equipped with a ranging sensor for detecting a sensed distance to an vehicle around the first vehicle and a receiver of a signal from a satellite positioning system located within the first vehicle for successively positioning a current location of the first vehicle; and
a wireless communication device mounted on a second vehicle equipped with a receiver of the signal from the satellite positioning system located within the second vehicle for successively positioning a current location of the second vehicle,
wherein the wireless communication device located within the first vehicle wirelessly communicates with the wireless communication device located within the second vehicle, and the wireless communication device located within the second vehicle wirelessly communicates with a wireless communication device mounted on a third vehicle equipped with a receiver of the signal from the satellite positioning system located within the third vehicle,
wherein the wireless communication device located within the second vehicle successively transmits information about the current location of the second vehicle,
wherein the wireless communication device located within the first vehicle includes:
a distance calculation device located within the first vehicle calculating a calculated distance between the first vehicle and the second vehicle based on the current location of the second vehicle and the current location of the first vehicle obtained by the receiver located within the first vehicle when the wireless communication device located within the first vehicle receives the information about the current location of the second vehicle from the wireless communication device in the second vehicle, which is a leading vehicle or a following vehicle of the first vehicle; and
a difference calculation device located within the first vehicle calculating a distance difference between the calculated distance calculated by the distance calculation device located within the first vehicle and the sensed distance to the second vehicle obtained by the ranging sensor,
wherein the wireless communication device located within the first vehicle transmits information about the distance difference, calculated by the difference calculation device located within the first vehicle, to the wireless communication device located within the second vehicle, and
wherein the wireless communication device located within the second vehicle includes:
a distance calculation device located within the second vehicle calculating a calculated distance between the second vehicle and the third vehicle based on the current location of the third vehicle and the current location of the second vehicle obtained by the receiver located within the second vehicle when the wireless communication device located within the second vehicle receives information about the current location of the third vehicle from the wireless communication device in the third vehicle, which is a leading vehicle of the second vehicle; and
an inter-vehicle distance determination device located within the second vehicle determining an inter-vehicle distance between the second vehicle and the third vehicle by correcting the calculated distance calculated by the distance calculation device located within the second vehicle using the distance difference when the wireless communication device located within the second vehicle receives the information about the distance difference from the wireless communication device located within the first vehicle, assuming that the inter-vehicle distance is not detected by a ranging sensor in the second vehicle.

2. The drive assist system according to claim 1,
wherein each of the wireless communication device of the first vehicle and the wireless communication device of the second vehicle stores information about an installment position of a respective receiver installed to a corresponding vehicle,
wherein the wireless communication device of the second vehicle transmits the information about the current location of the second vehicle together with an installment position of the receiver of the second vehicle and a driving direction of the second vehicle to the wireless communication device of the first vehicle,
wherein the wireless communication device of the first vehicle further includes an installment position displacement determination device for determining whether there is a displacement in a vehicle width direction between an installment position of the receiver of the first vehicle and the installment position of the receiver of the second vehicle, based on the installment position of the receiver of the first vehicle, a driving direction of the first vehicle, the installment position of the receiver of the second vehicle, and the driving direction of the second vehicle, and wherein the difference calculation device corrects an error caused by the displacement, based on an amount of the displacement, so that the difference calculation device calculates a corrected distance difference when the installment position displacement determination device of the first vehicle determines that there is the displacement in the vehicle width direction between the installment position of the receiver of the first vehicle and the installment position of the receiver of the second vehicle.

3. The drive assist system according to claim 2, wherein each of the wireless communication device of the first vehicle and the wireless communication device of the second vehicle obtains information about an azimuth angle of a respective vehicle, wherein the wireless communication device of the second vehicle transmits the information about the current location of the second vehicle together with an azimuth angle of the second vehicle, wherein the wireless communication device of the first vehicle further includes an azimuth displacement determination device for determining whether there is an azimuth displacement between an azimuth angle of the first vehicle and the azimuth angle of the second vehicle, based on the azimuth angle of the second vehicle received from the wireless communication device of the second vehicle and the azimuth of the first vehicle, and wherein the difference calculation device corrects an error caused by the displacement and the azimuth displacement, based on an amount of the displacement and an amount of the azimuth displacement, so that the difference calculation device calculates a corrected distance difference when the installment position displacement determination device of the first vehicle determines that there is the displacement in the vehicle width direction, and the azimuth displacement determination device of the first vehicle determines that there is the azimuth displacement.

4. The drive assist system according to claim 2, wherein the wireless communication device of the second vehicle further includes an installment position displacement determination device for determining whether there is displacement in a vehicle width direction between the installment position of the receiver of the second vehicle and an installment position of a receiver of the third vehicle, based on the installment position of the receiver of the second vehicle, the driving direction of the second vehicle, the installment position of the receiver of the third vehicle, and the driving direction of the third vehicle, when the wireless communication device of the second vehicle receives the information about the current location of the third vehicle from a wireless communication device in the third vehicle, wherein the distance calculation device of the second vehicle corrects an error caused by the displacement, based on an amount of the displacement, so that the distance calculation device of the second vehicle calculates a corrected calculated distance when the installment position displacement determination device of the second vehicle determines that there is the displacement in the vehicle width direction, and wherein the inter-vehicle distance determination device determines the inter-vehicle distance with using the corrected calculated distance.

5. The drive assist system according to claim 4, wherein the wireless communication device of the second vehicle further includes an azimuth displacement determination device for determining whether there is an azimuth displacement between the second vehicle and the third vehicle, based on the azimuth angle of the second vehicle and an azimuth angle of the third vehicle, when the wireless communication device of the second vehicle receives the information about the current location of the third vehicle from the wireless communication device in the third vehicle, and wherein the distance calculation device of the second vehicle corrects an error caused by the displacement in the vehicle width direction and the azimuth displacement, based on an amount of the displacement in the vehicle width direction and an amount of the azimuth displacement, so that the distance calculation device of the second vehicle calculates a corrected calculated distance, when the installment position displacement determination device of the second vehicle determines that there is the displacement in the vehicle width direction between the installment position of the receiver of the second vehicle and an installment position of the a receiver in the third vehicle, and further, the azimuth displacement determination device of the second vehicle determines that there is the azimuth displacement between the second vehicle and the third vehicle, and wherein the inter-vehicle distance determination device determines the inter-vehicle distance with using the corrected calculated distance.

6. The drive assist system according to claim 1, wherein the wireless communication device of the first vehicle transmits the information about the distance difference together with the information about the current location of the first vehicle, wherein the wireless communication device of the second vehicle further includes a selection device for selecting one of the informations from a corresponding wireless communication device, which is the nearest device to the second vehicle at the current location of the second vehicle, based on more than one information about the current location of the first vehicle and the current location of the second vehicle, when the wireless communication device of the second vehicle receives more than one information about the distance difference from more than one wireless communication devices, and wherein the inter-vehicle distance determination device determines the inter-vehicle distance based on the distance difference of the selected one of the informations and the calculated distance calculated by the distance calculation device on the second vehicle.

7. The drive assist system according to claim 1, wherein the wireless communication device of the first vehicle transmits the information about the distance difference together with the information about the current location of the first vehicle, wherein the wireless communication device of the second vehicle further includes a weighted average device for assigning a greater weight to the information of the distance difference received from a corresponding wireless communication device, which is a nearer device of the second vehicle at the current location of the second vehicle, based on more than one information about the current location of the first vehicle and the current location of the second vehicle, when the wireless communication device of the second vehicle receives more than one information about the distance difference from more than one wireless communication devices, and for calculating a weighted average on a plurality of distance differences, and wherein the inter-vehicle distance determination device determines the inter-vehicle distance based on the weighted average on the distance differences and the calculated distance calculated by the distance calculation device of the second vehicle.

8. The drive assist system according to claim 1, wherein the wireless communication device of the second vehicle further includes a representative value determination device for determining a representative value from a plurality of received distance differences, when the wireless communication device of the second vehicle receives more than one information about the distance difference from more than one wireless communication devices, and wherein the inter-vehicle distance determination device determines the inter-vehicle distance based on the representative value of the received distance differences and the calculated distance calculated by the distance calculation device of the second vehicle.

9. The drive assist system according to claim 8, wherein the representative value is an intermediate value of a plurality of the distance differences or an arithmetic average of a plurality of the distance differences.

10. A wireless communication device installed to a first vehicle equipped with a ranging sensor for detecting a sensed distance to an object around the first vehicle and a receiver of a signal from a satellite positioning system for positioning a current location of the first vehicle, the wireless communication device wirelessly communicating with a wireless communication device installed to a second vehicle equipped with a receiver of the signal from the satellite positioning system for positioning a current location of the second vehicle, and the wireless communication device of the first vehicle receiving information about the current location of the second vehicle from the wireless communication device of the second vehicle, the wireless communication device of the first vehicle comprising:

a distance calculation device for calculating a calculated distance between the first vehicle and the second vehicle based on the current location of the second vehicle received from the wireless communication device of the second vehicle and the current location of the first vehicle obtained by the receiver of the first vehicle, when the wireless communication device of the first vehicle receives the information about the current location of the second vehicle from the wireless communication device in the second vehicle, which is a leading vehicle or a following vehicle of the first vehicle; and a difference calculation device for calculating a distance difference between the calculated distance calculated by the distance calculation device and the sensed distance to the second vehicle obtained by the ranging sensor, wherein the wireless communication device of the first vehicle transmits information about the distance difference, calculated by the difference calculation device to the wireless communication device of the second vehicle; wherein the wireless communication device of the first vehicle stores information about a driving direction of the first vehicle and an installment position of the receiver installed to the first vehicle, wherein the wireless communication device of the first vehicle receives information about a driving direction of the second vehicle and an installment position of the receiver installed to the second vehicle, the wireless communication device of the first vehicle further comprising: an installment position displacement determination device for determining whether there is a displacement in a vehicle width direction between the installment position of the receiver of the first vehicle and the installment position of the receiver of the second vehicle, based on the installment position of the receiver or the first vehicle, the driving direction of the first vehicle, the installment position of the receiver of the second vehicle, and the driving direction of the second vehicle, and wherein the difference calculation device corrects an error caused by the displacement in the vehicle width direction, based on an amount of the displacement, so that the difference calculation device calculates a corrected distance difference when the installment position displacement determination device of the first vehicle determines that there is the displacement in the vehicle width direction between the installment position of the receiver of the first vehicle and the installment position of the receiver of the second vehicle.

11. The wireless communication device according to claim 10, wherein the wireless communication device of the first vehicle obtains information about an azimuth angle of the first vehicle, wherein the wireless communication device of the first vehicle receives information about an azimuth angle of the second vehicle from the wireless communication device of the second vehicle, the wireless communication device of the first vehicle further comprising:

an azimuth displacement determination device for determining whether there is an azimuth displacement between the azimuth angle of the first vehicle and the azimuth angle of the second vehicle, based on the azimuth angle of the second vehicle received from the wireless communication device of the second vehicle and the azimuth of the first vehicle, and wherein the difference calculation device corrects an error caused by the displacement in the vehicle width direction and the azimuth displacement, based on an amount of the displacement in the vehicle width direction and an amount of the azimuth displacement, so that the difference calculation device calculates a corrected distance difference when the installment position displacement determination device of the first vehicle determines that there is the displacement in the vehicle width direction, and the azimuth displacement determination device of the first vehicle determines that there is the azimuth displacement.

12. A wireless communication device installed to a second vehicle equipped with a receiver of a signal of a satellite positioning system for positioning a current location of the second vehicle, the wireless communication device of the second vehicle wirelessly communicating with a wireless communication device installed to a first vehicle equipped with a ranging sensor for detecting a sensed distance to an vehicle around the first vehicle and a receiver of the signal of the satellite positioning system for positioning a current location of the first vehicle, communicating with a wireless communication device installed to a third vehicle equipped with a receiver of the signal of the satellite positioning system for positioning a current location of the third vehicle, and receiving information about a distance difference, transmitted from and calculated by the wireless communication device of the first vehicle, between a calculated distance from the first vehicle to the second vehicle and a sensed distance from the first vehicle to the second vehicle obtained by the ranging sensor, wherein the calculated distance is calculated by the wireless communication device of the first vehicle based on the current location of the first vehicle calculated by the receiver of the first vehicle and the current location of the second vehicle calculated by the receiver of the second vehicle, the wireless communication device of the second vehicle comprising:
- a distance calculation device for calculating a calculated distance between the second vehicle and the third vehicle based on the current location of the third vehicle and the current location of the second vehicle obtained by the receiver of the second vehicle when the wireless communication device of the second vehicle receives information about the current location of the third vehicle from the wireless communication device in the third vehicle, which is a leading vehicle of the second vehicle; and
- an inter-vehicle distance determination device for determining an inter-vehicle distance between the second vehicle and the third vehicle by correcting the calculated distance calculated by the distance calculation device of the second vehicle using the distance difference when the wireless communication device of the second vehicle receives the information about the distance difference from the wireless communication device of the first vehicle, assuming that the inter-vehicle distance is not detected by a ranging sensor in the second vehicle.

13. The wireless communication device according to claim 12, further comprising:
- an installment position displacement determination device for determining whether there is displacement in a vehicle width direction between the installment position of the receiver of the second vehicle and an installment position of the receiver of the third vehicle, based on the installment position of the receiver of the second vehicle, a driving direction of the second vehicle, the installment position of the receiver of the third vehicle, and a driving direction of the third vehicle, when the wireless communication device of the second vehicle receives the information about the current location of the third vehicle from the wireless communication device in the third vehicle,
- wherein the distance calculation device corrects an error caused by the displacement in the vehicle width direction, based on an amount of the displacement, so that the distance calculation device of the second vehicle calculates a corrected calculated distance when the installment position displacement determination device determines that there is the displacement in the vehicle width direction, and
- wherein the inter-vehicle distance determination device determines the inter-vehicle distance with using the corrected calculated distance.

14. The wireless communication device according to claim 13, further comprising:
- an azimuth displacement determination device for determining whether there is an azimuth displacement between the second vehicle and the third vehicle, based on an azimuth angle of the second vehicle and an azimuth angle of the third vehicle, when the wireless communication device of the second vehicle receives the information about the current location of the third vehicle from the wireless communication device in the third vehicle,
- wherein the distance calculation device of the second vehicle corrects an error caused by the displacement in the vehicle width direction and the azimuth displacement, based on an amount of the displacement in the vehicle width direction and an amount of the azimuth displacement, so that the distance calculation device calculates a corrected calculated distance, when the installment position displacement determination device of the second vehicle determines that there is the displacement in the vehicle width direction between the installment position of the receiver of the second vehicle and an installment position of the receiver of the third vehicle, and further, the azimuth displacement determination device determines that there is the azimuth displacement between the second vehicle and the third vehicle, and
- wherein the inter-vehicle distance determination device determines the inter-vehicle distance with using the corrected calculated distance.

15. The wireless communication device according to claim 12,
- wherein the wireless communication device of the second vehicle receives informations from more than one wireless communication devices, each of which transmits information about the distance difference together with information about the current location of the first vehicle,
- the wireless communication device of the second vehicle further comprising:
- a selection device for selecting one of the informations from a corresponding wireless communication device, which is the nearest device of the second vehicle at the current location of the second vehicle, based on more than one information about the current location of each vehicle and the current location of the second vehicle, when the wireless communication device of the second vehicle receives more than one information about the distance difference from the more than one wireless communication devices,
- wherein the inter-vehicle distance determination device determines the inter-vehicle distance based on the distance difference of the selected one of the informations and the calculated distance calculated by the distance calculation device of the second vehicle.

16. The wireless communication device according to claim 12,
- wherein the wireless communication device of the second vehicle receives informations from more than one wireless communication devices, each of which transmits information about a distance difference together with information about the current location of the first vehicle,
- the wireless communication device of the second vehicle further comprising:
- a weighted average device for assigning a greater weight to the information of the distance difference received from a corresponding wireless communication device, which is a nearer device of the second vehicle at the current location of the second vehicle, based on more than one information about the current location of the second vehicle and the current location of the second vehicle, when the wireless communication device of the second vehicle receives more than one information about the distance difference from the more than one wireless communication devices, and for calculating the weighted average on the plurality of distance differences, and wherein the inter-vehicle distance determination device determines the inter-vehicle distance based on the weighted average on the distance differences and the calculated distance calculated by the distance calculation device of the second vehicle.

17. The wireless communication device according to claim 12, further comprising:

a representative value determination device for determining a representative value from a plurality of received distance differences, when the wireless communication device of the second vehicle receives more than one information about the distance difference from more than one wireless communication devices, and wherein the inter-vehicle distance determination device determines the inter-vehicle distance based on the representative value of the received distance differences and the calculated distance calculated by the distance calculation device of the second vehicle.

18. A drive assist system for vehicles comprising:

a wireless communication device mounted on a first vehicle equipped with a ranging sensor for detecting a sensed distance to an vehicle around the first vehicle and a receiver of a signal from a satellite positioning system for successively positioning a current location of the first vehicle;

a wireless communication device mounted on a second vehicle equipped with a receiver of the signal of the satellite positioning system for successively positioning a current location of the second vehicle;

a wireless communication device mounted on a third vehicle equipped with a receiver of the signal of the satellite positioning system for successively positioning a current location of the third vehicle, which is a leading vehicle or a following vehicle of the first vehicle, wherein the wireless communication device of the first vehicle wirelessly communicates with the wireless communication device of the second vehicle and the wireless communication device of the third vehicle, wherein the wireless communication device of the second vehicle successively transmits information about the current location of the second vehicle, wherein the wireless communication device of the first vehicle includes:

a distance calculation device for calculating a calculated distance between the first vehicle and the second vehicle based on the current location of the second vehicle received from the wireless communication device of the second vehicle and the current location of the first vehicle obtained by the receiver of the first vehicle when the wireless communication device of the first vehicle receives the information about the current location of the second vehicle from the wireless communication device in the second vehicle, which is a leading vehicle or a following vehicle of the first vehicle; and a difference calculation device for calculating a distance difference between the calculated distance calculated by the distance calculation device of the first vehicle and the sensed distance to the second vehicle obtained by the ranging sensor, wherein the wireless communication device of the first vehicle transmits information about the distance difference, calculated by the difference calculation device, to the wireless communication device of the third vehicle, wherein the wireless communication device of the third vehicle includes:

a distance calculation device for calculating a calculated distance between the first vehicle and the third vehicle based on the current location of the third vehicle received from the wireless communication device of the third vehicle and the current location of the first vehicle obtained by the receiver of the first vehicle when the wireless communication device of the third vehicle receives information about the current location of the first vehicle from the wireless communication device in the first vehicle; and an inter-vehicle distance determination device for determining an inter-vehicle distance between the first vehicle and the third vehicle by correcting the calculated distance calculated by the distance calculation device of the first vehicle using the distance difference when the wireless communication device of the third vehicle receives the information about the distance difference from the wireless communication device of the first vehicle, assuming that the inter-vehicle distance is not detected by a ranging sensor in the third vehicle.

* * * * *